US012684096B2

(12) United States Patent
Jedamzik et al.

(10) Patent No.: US 12,684,096 B2
(45) Date of Patent: Jul. 14, 2026

(54) IMAGING SYSTEM INCLUDING BEAM GUIDING ELEMENT HAVING HIGH SOLARIZATION RESISTANCE IN THE BLUE SPECTRAL RANGE

(71) Applicant: Schott AG, Mainz (DE)

(72) Inventors: Ralf Jedamzik, Griesheim (DE); Antoine Carré, Mainz (DE); Sebastian Leukel, Mainz (DE); Volker Hagemann, Nieder-Olm (DE); Uwe Petzold, Osthofen (DE); Lothar Bartelmess, Klein-Winternheim (DE); Peter Nass, Mainz (DE)

(73) Assignee: SCHOTT AG, Mainz (DE)

( * ) Notice: Subject to any disclaimer, the term of this patent is extended or adjusted under 35 U.S.C. 154(b) by 899 days.

(21) Appl. No.: 17/994,885

(22) Filed: Nov. 28, 2022

(65) Prior Publication Data

US 2023/0090497 A1     Mar. 23, 2023

Related U.S. Application Data

(63) Continuation of application No. PCT/EP2021/064395, filed on May 28, 2021.

(30) Foreign Application Priority Data

May 28, 2020    (DE) ..................... 10 2020 114 365.6
Apr. 27, 2021    (DE) ..................... 10 2021 110 793.8

(51) Int. Cl.
H04N 9/31 (2006.01)
H01S 3/00 (2006.01)

(52) U.S. Cl.
CPC ......... H04N 9/3161 (2013.01); H01S 3/0071 (2013.01)

(58) Field of Classification Search
None
See application file for complete search history.

(56) References Cited

U.S. PATENT DOCUMENTS

| | | |
|---|---|---|
| 5,925,468 A | 7/1999 | Stewart |
| 7,217,673 B2 | 5/2007 | Naumann et al. |

(Continued)

FOREIGN PATENT DOCUMENTS

| | | |
|---|---|---|
| JP | 7-213077 A | 8/1995 |
| JP | 2012-36091 A | 2/2012 |
| WO | 2010/038597 A1 | 4/2010 |

OTHER PUBLICATIONS

International Search Report dated Nov. 25, 2021 for International Patent Application No. PCT/EP2021/064395 (28 pages).

*Primary Examiner* — Bao-Luan Q Le
*Assistant Examiner* — Danell L Owens
(74) *Attorney, Agent, or Firm* — TAYLOR & EDELSTEIN, PC

(57) ABSTRACT

An imaging system, includes: a laser light source having a wavelength from 380 nm to 490 nm; and a beam guidance element, the laser light source configured for generating an average surface power density of more than 10 W/cm$^2$, the beam guidance element including a glass which has a quality factor $F(436 \text{ nm})=S(436 \text{ nm})*(Abs_0(436 \text{ nm})+Abs_1(436 \text{ nm}))/k$, wherein $S(436 \text{ nm})$ is a thermality at a wavelength of 436 nm, $Abs_1(436 \text{ nm})$ is an additional absorbance in comparison to $Abs_0(436 \text{ nm})$ at a wavelength of 436 nm after an irradiation with a power density of 345 W/cm$^2$ for 72 hours with a laser light having a wavelength of 455 nm, $Abs_0(436 \text{ nm})$ is an absorbance at a wavelength of 436 nm of a sample having a thickness of 100 mm without the irradiation, k is the thermal conductivity, and the quality factor $F(436 \text{ nm})$ is <15 ppm/W.

14 Claims, 3 Drawing Sheets

(56)     References Cited

U.S. PATENT DOCUMENTS

| | | | |
|---|---|---|---|
| 7,976,174 | B2 | 7/2011 | Zimmermann |
| 7,988,305 | B2 | 8/2011 | Itoh et al. |
| 2006/0205583 | A1* | 9/2006 | Naumann ............... C03C 3/091 |
| | | | 501/66 |
| 2007/0165685 | A1 | 7/2007 | Mizuuchi et al. |
| 2010/0212742 | A1 | 8/2010 | Engel et al. |
| 2015/0293271 | A1 | 10/2015 | Miyasaka et al. |
| 2018/0136446 | A1 | 5/2018 | Werley et al. |

* cited by examiner

IMAGING SYSTEM INCLUDING BEAM GUIDING ELEMENT HAVING HIGH SOLARIZATION RESISTANCE IN THE BLUE SPECTRAL RANGE

CROSS REFERENCE TO RELATED APPLICATIONS

This is a continuation of PCT application no. PCT/EP2021/064395, entitled "IMAGING SYSTEM COMPRISING BEAM GUIDING ELEMENT HAVING HIGH SOLARIZATION RESISTANCE IN THE BLUE SPECTRAL RANGE", filed May 28, 2021, which is incorporated herein by reference. PCT application no. PCT/EP2021/064395 claims priority to: (1) German patent application no. 10 2020 114 365.6, filed May 28, 2020, which is incorporated herein by reference; and (2) German patent application no. 10 2021 110 793.8, filed Apr. 27, 2021, which is incorporated herein by reference.

BACKGROUND OF THE INVENTION

1. Field of the Invention

The present invention relates to an imaging system. The invention also relates to the use of the imaging system, especially in projectors and in materials processing.

2. Description of the Related Art

Light sources for projectors are presently transitioning from xenon to laser illuminants and pure RGB laser sources with constantly increasing luminous fluxes and power densities. Present-day cinema projectors with laser sources are achieving, for example, a luminous flux of up to 75,000 lumens and surface power densities of up to 50 W/cm$^2$ or more. The increasing luminous fluxes and power densities are increasing the thermal load on optical components, to the detriment of projection quality and of long-term stability. The optical system of a cinema projector consists typically of a large-volume prism arrangement and a projection objective. The prism arrangement in particular is exposed to a high thermal load. The demands on optical glasses in terms of low absorption losses, meaning maximum transmission and low solarization tendency, meaning low induced absorption losses in use, are therefore continually increasing.

Traditional xenon-based cinema projectors have maximum luminous fluxes of up to 45,000 lumens. In modern laser-based projectors, however, luminous fluxes of up to 75,000 lumens and surface power densities of up to 50 W/cm$^2$ or more are attained. A powerful blue laser stimulates emission of yellow light in a converter. The green and yellow channels are extracted from the yellow light using dichroic filters. A portion of the blue light is used for the blue channel. All three channels are then used for projection.

The projection system oftentimes consists of a complex prism arrangement to guide the individual color channels to the DLP chips and to mix the signals for image generation. The optical path length may be greater than 100 to 200 mm. Any light absorption within the prism arrangement results in temperature gradients and thermal lens effects. The prism glass ought therefore to have as high as possible a transmission in the visible wavelength range. Further effects which become increasingly significant with the increasing luminous fluxes of the projectors are solarization effects in the glass. Absorption-induced generation of defect centers in the prism glass may lead to a reduction in transmission, which is associated in turn with thermal lens effects.

Such solarization effects, however, are not relevant only in optical systems of modern projectors. Such phenomena also play an increasing part in the context of applications in materials processing.

What is needed in the art are imaging systems having beam guiding elements which exhibit high solarization resistance in the blue spectral range and can therefore be employed outstandingly in projectors, but also in applications in materials processing.

SUMMARY OF THE INVENTION

The present invention relates to an imaging system comprising at least one laser light source having a wavelength in the blue spectral range and a beam guiding element with high solarization resistance at high beam power densities. The invention also relates to the use of the imaging system, especially in projectors and in materials processing.

Imaging systems are, in particular, systems having at least one light source and at least one beam guiding element, more particularly lenses, prisms, aspheres, plane plates, freeforms, fast axis collimators and/or light-guiding rods. Light-guiding rods of this kind exploit the total internal reflection at the glass-air boundary and typically have a length of not more than 300 mm. Imaging systems of these kinds are used, for example, in projectors, especially in cinema projectors. In this context an imaging system ensures the generation of an image which can be seen by the observer, on a screen, for example, by guiding the light beam from the light source in a targeted way. The highest power densities typically occur in the prisms, especially in prisms which provide for the mixing of the color channels. It is therefore particularly important for prism beam guiding elements of these kinds to be provided in materials which are able to withstand these power densities without any relevant solarization effects occurring. Imaging systems are also employed in the context of materials processing. Through targeted beam guidance, in the form of fast axis collimators, for example, the light from the light source can be focused onto the material for machining in such a way that the energy input of the light radiation can be utilized for materials processing.

The present invention provides an imaging system including:

a) at least one laser light source B having a wavelength $\lambda_B$ in the spectral range from 380 nm to 490 nm; and b) a beam guidance element, where the laser light source B is suitable for generating, in at least one point of the beam guidance element, an average surface power density of more than 10 W/cm$^2$, and the beam guidance element consists of a glass which has a quality factor $F(436\ nm) = S(436\ nm) * (Abs_0(436\ nm) + Abs_1(436\ nm))/k$, where $F(436\ nm)$ is <15 ppm/W.

The present invention also provides an imaging system including:

a) at least one laser light source B having a wavelength $\lambda_B$ in the spectral range from 380 nm to 490 nm, at least one laser light source G having a wavelength $\lambda_G$ in the spectral range from >490 nm to 585 nm, and at least one laser light source R having a wavelength $\lambda_R$ in the spectral range from >585 nm to 750 nm; and b) a beam guidance element, where the laser light source B, the laser light source G and the laser light source R are suitable for generating, in at least one point of the beam guidance element, an average surface power density of more than 10 $W/cm^2$, and the beam guidance element consists of a glass which has a quality factor $F(RGB)=F(436\ nm)+F(546\ nm)+F(644\ nm)=S(436\ nm)*(Abs_0(436\ nm)+Abs_1(436\ nm))/k+S(546\ nm)*(Abs_0(546\ nm)+Abs_1(546\ nm))/k+S(644\ nm)*(Abs_0(644\ nm)+Abs_1(644\ nm))/k$, where $F(RGB)$ is <40 ppm/W.

The present invention also provides an imaging system including:

a) at least one laser light source B having a wavelength $\lambda_B$ in the spectral range from 380 nm to 490 nm; and b) a beam guidance element, where the laser light source B is suitable for generating, in at least one point of the beam guidance element, an average surface power density of more than 10 $W/cm^2$, and the beam guidance element consists of a glass which has an induced absorbance $Abs_1(436\ nm)$, where $Abs_1(436\ nm)$ is <0.01/cm.

The present invention also provides an imaging system including:

a) at least one laser light source B having a wavelength $\lambda_B$ in the spectral range from 380 nm to 490 nm, at least one laser light source G having a wavelength $\lambda_G$ in the spectral range from >490 nm to 585 nm, and at least one laser light source R having a wavelength $\lambda_R$ in the spectral range from >585 nm to 750 nm; and b) a beam guidance element, where the laser light source B, the laser light source G and the laser light source R are suitable for generating, in at least one point of the beam guidance element, an average surface power density of more than 10 $W/cm^2$, and the beam guidance element consists of a glass which has an induced absorbance $Abs_1(RGB)=Abs_1(436\ nm)+Abs_1(546\ nm)+Abs_1(644\ nm)$, where $Abs_1(RGB)$ is <0.03/cm.

The present invention also provides an imaging system including:

a) at least one laser light source B having a wavelength $\lambda_B$ in the spectral range from 380 nm to 490 nm; and b) a beam guidance element, where the laser light source B is suitable for generating, in at least one point of the beam guidance element, an average surface power density of more than 10 $W/cm^2$, and the beam guidance element consists of a glass which has one or more of the following properties:

a quality factor $F(436\ nm)=S(436\ nm)*(Abs_0(436\ nm)+Abs_1(436\ nm))/k$, where $F(436\ nm)$ is <15 ppm/W;

an induced absorbance $Abs_1(436\ nm)<0.01/cm$.

The present invention also provides an imaging system including:

a) at least one laser light source B having a wavelength $\lambda_B$ in the spectral range from 380 nm to 490 nm, at least one laser light source G having a wavelength $\lambda_G$ in the spectral range from >490 nm to 585 nm, and at least one laser light source R having a wavelength $\lambda_R$ in the spectral range from >585 nm to 750 nm; and b) a beam guidance element, where the laser light source B, the laser light source G and the laser light source R are suitable for generating, in at least one point of the beam guidance element, an average surface power density of more than 10 $W/cm^2$, and the beam guidance element consists of a glass which has one or more of the following properties, as for example at least two or at least three of the properties:

a quality factor $F(436\ nm)=S(436\ nm)*(Abs_0(436\ nm)+Abs_1(436\ nm))/k$, where $F(436\ nm)$ is <15 ppm/W;

a quality factor $F(RGB)=F(436\ nm)+F(546\ nm)+F(644\ nm)=S(436\ nm)*(Abs_0(436\ nm)+Abs_1(436\ nm))/k+S$ $(546\ nm)*(Abs_0(546\ nm)+Abs_1(546\ nm))/k+S(644\ nm)*(Abs_0(644\ nm)+Abs_1(644\ nm))/k$, where $F(RGB)$ is <40 ppm/W;

an induced absorbance $Abs_1(436\ nm)<0.01/cm$;

an induced absorbance $Abs_1(RGB)=Abs_1(436\ nm)+Abs_1(546\ nm)+Abs_1(644\ nm)$, where $Abs_1(RGB)$ is <0.03/cm.

The present invention also provides an imaging system including:

a) at least one laser light source B having a wavelength $\lambda_B$ in the spectral range from 380 nm to 490 nm, at least one laser light source G having a wavelength $\lambda_G$ in the spectral range from >490 nm to 585 nm, and at least one laser light source R having a wavelength $\lambda_R$ in the spectral range from >585 nm to 750 nm; and b) a beam guidance element, where the laser light source B, the laser light source G and the laser light source R are suitable for generating, in at least one point of the beam guidance element, an average surface power density of more than 10 $W/cm^2$, and the beam guidance element consists of a glass which has one or more of the following properties, as for example at least two of the properties:

a quality factor $F(436\ nm)=S(436\ nm)*(Abs_0(436\ nm)+Abs_1(436\ nm))/k$, where $F(436\ nm)$ is <15 ppm/W;

a quality factor $F(RGB)=F(436\ nm)+F(546\ nm)+F(644\ nm)=S(436\ nm)*(Abs_0(436\ nm)+Abs_1(436\ nm))/k+S(546\ nm)*(Abs_0(546\ nm)+Abs_1(546\ nm))/k+S(644\ nm)*(Abs_0(644\ nm)+Abs_1(644\ nm))/k$, where $F(RGB)$ is <40 ppm/W;

an induced absorbance $Abs_1(436\ nm)<0.01/cm$.

The imaging system of the invention may include further components, examples being image-generating chips (more particularly DLP chips) and/or a projection optics.

The imaging system of the invention includes a laser light source B having a wavelength $\lambda_B$ in the spectral range from 380 nm to 490 nm. The imaging system optionally includes a laser light source B having a wavelength $\lambda_B$ in the spectral range from 400 nm to 485 nm, optionally from 420 nm to 480 nm, optionally from 430 nm to 475 nm, optionally from 440 nm to 470 nm, optionally from 445 nm to 460 nm.

The imaging system of the invention may optionally include further laser light sources.

The imaging system of the invention may include a laser light source G having a wavelength $\lambda_G$ in the spectral range from >490 nm to 585 nm. The imaging system optionally includes a laser light source G having a wavelength $\lambda_G$ in the spectral range from 510 nm to 580 nm, optionally from 520 nm to 570 nm, optionally from 530 nm to 560 nm, optionally from 540 nm to 550 nm.

The imaging system of the invention may include a laser light source R having a wavelength $\lambda_R$ in the spectral range from >585 nm to 750 nm. The imaging system optionally includes a laser light source R having a wavelength $\lambda_R$ in the spectral range from 600 nm to 720 nm, optionally from 610 nm to 700 nm, optionally from 620 nm to 680 nm, optionally from 630 nm to 660 nm, optionally from 640 nm to 650 nm.

Optionally the imaging system of the invention, additionally to a laser light source B having a wavelength $\lambda_B$ in the spectral range from 380 nm to 490 nm, includes both a laser light source G having a wavelength $\lambda_G$ in the spectral range from >490 nm to 585 nm and a laser light source R having a wavelength $\lambda_R$ in the spectral range from >585 nm to 750 nm.

The laser light source B having a wavelength $\lambda_B$ in the spectral range from 380 nm to 490 nm is suitable for generating, in at least one point of the beam guidance element, optionally over an area of at least 0.1 cm$^2$, optionally at least 0.5 cm$^2$, optionally at least 1 cm$^2$, optionally at least 2 cm$^2$, optionally at least 3 cm$^2$, optionally at least 5 cm$^2$, optionally at least 7 cm$^2$, optionally at least 9 cm$^2$ of the beam guidance element, an average surface power density of more than 10 W/cm$^2$. Optionally the laser light source B having a wavelength $\lambda_B$ in the spectral range from 380 nm to 490 nm, is suitable for generating, in at least one point of the beam guidance element, optionally on an area of at least 0.1 cm$^2$, optionally at least 0.5 cm$^2$, optionally at least 1 cm$^2$, optionally at least 2 cm$^2$, optionally at least 3 cm$^2$, optionally at least 5 cm$^2$, optionally at least 7 cm$^2$, optionally at least 9 cm$^2$ of the beam guidance element, an average surface power density of more than 10 W/cm$^2$ to 400 W/cm$^2$, optionally of 20 W/cm$^2$ to 300 W/cm$^2$, optionally of 50 W/cm$^2$ to 250 W/cm$^2$, as for example 75 W/cm$^2$ to 200 W/cm$^2$ or 100 W/cm$^2$ to 150 W/cm$^2$.

The imaging system of the invention optionally includes a beam guidance element which consists of a glass which has a quality factor F(436 nm)=S(436 nm)*(Abs$_0$(436 nm)+ Abs$_1$(436 nm))/k, where F(436 nm) is <15 ppm/W.

Under irradiation of energetic photons in the UV range, defects are induced in materials and lead to alterations in the spectral transmission. Where these are located in the visible spectral range, this is associated with unwanted color changes. This phenomenon is undesirable particularly in the case of optical components made of glass. Surprisingly, it is now apparent that at high laser power densities, it is possible in the visible spectral range as well, e.g., at 455 nm, for defect centers to be induced (=solarization) of the kind which in the case of conventional light sources occurs only when they emit in the UV/NUV. Without being limited to any particular explanation, it is presently assumed that the incidence of solarization effects on irradiation with visible light is attributable in particular to nonlinear effects which accompany the high power densities. On stimulation with sufficient power density, it would be possible for two-photon absorption to occur, corresponding to the energy of one photon at half the wavelength (e.g. 455 nm/2=227.5 nm) and hence corresponding, so to speak, to a UV absorption. In contrast to conventional UV solarization, this effect is in general not restricted to a near-surface volume of the glass facing the light source, but may instead occur along the entire optical path length. The defect centers formed induce new absorption bands, which reduce the transmitted intensity.

Accompanying the induced absorption bands is an increase in temperature within the optical material/glass; because refractive index and geometric path change with the temperature, there is a wavefront retardation, and unwanted imaging errors occur.

This results in particularly exacting requirements for the material of beam guidance elements which are used in imaging systems which include laser light sources suitable for generating an average surface power density of more than 10 W/cm$^2$ in at least one point of the beam guidance element. One object of the present invention, therefore, is to provide imaging systems which prevent or at least greatly reduce the unwanted imaging errors.

An illustrative embodiment of an imaging system of the present invention is shown schematically in FIG. 1. According to this embodiment, the imaging system is a DLP projector. The expression "DLP" is an abbreviation of the term "Digital Light Processing". The imaging system of the invention shown in FIG. 1 includes a laser light source 1 and a beam guidance element 2. In the invention the imaging system includes at least one laser light source B having a wavelength $\lambda_B$ in the spectral range from 380 nm to 490 nm. It is also possible for there to be more than one laser light source in the imaging system of the invention; in particular, in addition to the blue laser light source, there may also be a green laser light source and/or a red laser light source present. The laser light source 1, represented for simplification in FIG. 1 as a single box, may represent, for example, three different-colored diode lasers, more particularly a blue diode laser, a green diode laser and a red diode laser. It is also possible for only the blue laser light source to be present. In certain embodiments, blue light emitted by a blue laser light source can be converted by way of a converter, more particularly a ceramic converter, via luminescence, into light with a higher wavelength, as for example into yellow, green, red and/or yellow-green light.

In the DLP projector represented in FIG. 1, the laser light source 1 emits blue, green and red light (represented by the arrow 5). This may be achieved, for example, by the laser light source 1 representing the presence of a blue, a green and a red diode laser. It is also possible for only the blue laser to be present and for the green and red light additionally emitted to be generated by the use of converter material. After leaving the laser light source 1, the three colors 5 emitted by the laser light source 1 reach the beam guidance element 2. The beam guidance element 2 includes at least one prism and may also, for example, represent a prism arrangement including two or more prisms. A prism arrangement may consist, for example, of two or three prisms. The arrow 6 shows that the beam guidance element 2 deflects the light of the three colors emitted by the laser light source 1 to image-generating chips 3. The light of each of the three colors (blue, green and red) is optionally redirected to a respective image-generating chip 3. For the sake of simplicity, FIG. 1 shows only a single box, which represents the image-generating chips 3. Optional image-generating chips 3 are DLP chips 3. The imaging system optionally includes one image-generating chip 3 for each color channel. Optionally, therefore, the box shown in FIG. 1 represents three image-generating chips 3 (one each for blue, green and red), more particularly three DLP chips 3.

The images generated by the DLP chips 3 (more particularly, one image each in blue, green and red) then reach the beam guidance element 2, more particularly the prism 2 or the prism arrangement 2. This is shown by the arrow 7.

The beam guidance element 2 then ensures that a composite color image reaches the projection optics 4. This is shown by the arrow 8.

In the region of the beam guidance element 2 in particular, the surface power densities may be very high. It is therefore important for the beam guidance element 2 to consist of a glass which has a quality factor according to the invention.

That the present invention also provides the beam guidance element which consists of a glass which has a quality factor F(436 nm)=S(436 nm)*(Abs$_0$(436 nm)+Abs$_1$(436 nm))/k, where F(436 nm) is <15 ppm/W.

The quality factor F takes account of a variety of factors which, in the combination found here, lead to a reduction in imaging errors. The factors taken into account include both wavelength-dependent and wavelength-independent factors. The quality factor F(436 nm) at a wavelength of 436 nm is representative of the behavior of the glass in the spectral range from 380 nm to 490 nm. This range in turn is representative of the behavior of the glass in the entire visible spectral range. Optionally F(436 nm)<15 ppm/W.

The behavior of the glass at wavelengths outside the range from 380 nm to 490 nm may in certain cases, albeit to a lesser extent, contribute to imaging errors. The quality factor F(436 nm) is sufficient in principle for describing the quality of glass. In certain cases, however, it may be useful to take into account not only the behavior of the glass at a wavelength of 436 nm but also the behavior at a wavelength of 546 nm, which is representative of the wavelength range from >490 nm to 585 nm, and/or the behavior at a wavelength of 644 nm, which is representative of the wavelength range from >585 nm to 750 nm. The beam guidance element optionally consists of a glass which has a quality factor $F(546 \text{ nm})=S(546 \text{ nm})*(Abs_0(546 \text{ nm})+Abs_1(546 \text{ nm}))/k$, where F(546 nm) is <12 ppm/W, and/or which has a quality factor $F(644 \text{ nm})=S(644 \text{ nm})*(Abs_0(644 \text{ nm})+Abs_1(644 \text{ nm}))/k$, where F(644 nm) is <10 ppm/W.

From the behavior of the glass at 436 nm, 546 nm and 644 nm it is possible to determine a quality factor F(RGB). The beam guidance element optionally consists of a glass which has a quality factor $F(RGB)=F(436 \text{ nm})+F(546 \text{ nm})+F(644 \text{ nm})=S(436 \text{ nm})*(Abs_0(436 \text{ nm})+Abs_1(436 \text{ nm}))/k+S(546 \text{ nm})*(Abs_0(546 \text{ nm})+Abs_1(546 \text{ nm}))/k+S(644 \text{ nm})*(Abs_0(644 \text{ nm})+Abs_1(644 \text{ nm}))/k$, where F(RGB) is <40 ppm/W.

The quality factor F takes account of the thermality $S(\lambda)$, the noninduced absorbance $Abs_0(\lambda)$, the induced absorbance $Abs_1(\lambda)$ and the thermal conductivity k of the glass. Thermality, noninduced absorbance and induced absorbance are wavelength-dependent variables. The thermal conductivity is independent of the wavelength. The noninduced absorbance $Abs_0(\lambda)$ may serve as a measure of the absorbance in the as-supplied state or before the intended use. The induced absorbance $Abs_1(\lambda)$ may serve as a measure of the absorbance potentially induced by proper operation.

Optionally F(436 nm)<15 ppm/W. Optionally F(436 nm) is not more than 14.5 ppm/W, optionally not more than 14 ppm/W, optionally not more than 13.5 ppm/W, optionally not more than 13 ppm/W, optionally not more than 12.5 ppm/W, optionally not more than 12 ppm/W, optionally not more than 11.5 ppm/W, optionally not more than 11 ppm/W, optionally not more than 10.5 ppm/W, optionally not more than 10 ppm/W, optionally not more than 9.5 ppm/W, optionally not more than 9 ppm/W, optionally not more than 8.5 ppm/W, optionally not more than 8 ppm/W, optionally not more than 7.5 ppm/W, optionally not more than 7 ppm/W, optionally not more than 6.5 ppm/W, optionally not more than 6 ppm/W, optionally not more than 5.5 ppm/W, optionally not more than 5 ppm/W, optionally not more than 4.5 ppm/W, optionally not more than 4 ppm/W, optionally not more than 3.5 ppm/W, optionally not more than 3 ppm/W. In certain embodiments F(436 nm) is at least 0.1 ppm/W, at least 0.5 ppm/W, at least 1 ppm/W or at least 2 ppm/W.

Optionally F(546 nm)<12 ppm/W. Optionally F(546 nm) is not more than 11.5 ppm/W, optionally not more than 11 ppm/W, optionally not more than 10.5 ppm/W, optionally not more than 10 ppm/W, optionally not more than 9.5 ppm/W, optionally not more than 9 ppm/W, optionally not more than 8.5 ppm/W, optionally not more than 8 ppm/W, optionally not more than 7.5 ppm/W, optionally not more than 7 ppm/W, optionally not more than 6.5 ppm/W, optionally not more than 6 ppm/W, optionally not more than 5.5 ppm/W, optionally not more than 5 ppm/W, optionally not more than 4.5 ppm/W, optionally not more than 4 ppm/W, optionally not more than 3.5 ppm/W, optionally not more than 3 ppm/W, optionally not more than 2.5 ppm/W, optionally not more than 2 ppm/W. In certain embodiments F(546 nm) is at least 0.001 ppm/W, at least 0.005 ppm/W, at least 0.01 ppm/W, at least 0.02 ppm/W, at least 0.1 ppm/W, at least 0.5 ppm/W or at least 1 ppm/W.

Optionally F(644 nm)<10 ppm/W. Optionally F(644 nm) is not more than 9.5 ppm/W, optionally not more than 9 ppm/W, optionally not more than 8.5 ppm/W, optionally not more than 8 ppm/W, optionally not more than 7.5 ppm/W, optionally not more than 7 ppm/W, optionally not more than 6.5 ppm/W, optionally not more than 6 ppm/W, optionally not more than 5.5 ppm/W, optionally not more than 5 ppm/W, optionally not more than 4.5 ppm/W, optionally not more than 4 ppm/W, optionally not more than 3.5 ppm/W, optionally not more than 3 ppm/W, optionally not more than 2.75 ppm/W, more optionally not more than 2.5 ppm/W, optionally not more than 2.25 ppm/W, optionally not more than 2 ppm/W, optionally not more than 1.75 ppm/W, optionally not more than 1.5 ppm/W, optionally not more than 1.25 ppm/W, optionally not more than 1 ppm/W. In certain embodiments F(546 nm) is at least 0.001 ppm/W, at least 0.005 ppm/W, at least 0.01 ppm/W or at least 0.02 ppm/W, at least 0.1 ppm/W, at least 0.5 ppm/W or at least 0.75 ppm/W.

Optionally, therefore, the beam guidance element consists of a glass which has a quality factor $F(RGB)=F(436 \text{ nm})+F(546 \text{ nm})+F(644 \text{ nm})=S(436 \text{ nm})*(Abs_0(436 \text{ nm})+Abs_1(436 \text{ nm}))/k+S(546 \text{ nm})*(Abs_0(546 \text{ nm})+Abs_1(546 \text{ nm}))/k+S(644 \text{ nm})*(Abs_0(644 \text{ nm})+Abs_1(644 \text{ nm}))/k$, where F(RGB) is <40 ppm/W. Optionally F(RGB) is not more than 38.5 ppm/W, optionally not more than 37 ppm/W, optionally not more than 35.5 ppm/W, optionally not more than 34 ppm/W, optionally not more than 32.5 ppm/W, optionally not more than 31 ppm/W, optionally not more than 29.5 ppm/W, optionally not more than 28 ppm/W, optionally not more than 26.5 ppm/W, optionally not more than 25 ppm/W, optionally not more than 23.5 ppm/W, optionally not more than 22 ppm/W, optionally not more than 20.5 ppm/W, optionally not more than 19 ppm/W, more optionally not more than 17.5 ppm/W, more optionally not more than 16 ppm/W, optionally not more than 14.5 ppm/W, optionally not more than 13 ppm/W, optionally not more than 11.5 ppm/W, optionally not more than 10 ppm/W, optionally not more than 9 ppm/W, optionally not more than 8 ppm/W, optionally not more than 7 ppm/W, optionally not more than 6 ppm/W. In certain embodiments F(RGB) is at least 0.5 ppm/W, at least 1 ppm/W, at least 2 ppm/W or at least 5 ppm/W.

A variable which has a critical influence on the quality factor F is the wavelength-dependent thermality $S(\lambda)$. The thermality describes the relative change in the optical path $s=(n-1)*d$ with the temperature T, where n is the refractive index and d is the sample thickness. The following relationship is valid: $S=1/s*ds/dT$. Since both $d=d(T)$ and $n=n(T)$, the following is the case: $S=1/s*(dn/dT*d+(n-1) \, dd/dT)$. Accordingly $S=1/(n-1)*dn/dT+1/d*dd/dT=1/(n-1)*dn/dT+CTE$. The CTE is the thermal expansion coefficient or coefficient of thermal expansion.

The coefficient of thermal expansion is determined optionally as described in DIN 51045-1:2005-08 and DIN ISO 7991 1998-02. Here, a glass sample of defined length is prepared, and the relative change in length (deltaL/L) per temperature interval (delta T) is measured in a dilatometer. The thermality $S(\lambda)$ is calculated optionally using the average coefficient of thermal expansion in a temperature range from −30° C. to +70° C. A low thermal expansion coefficient is advantageous, more particularly in a temperature range from −30° C. to 70° C. (CTE (−30/70)). The CTE (−30/70) is optionally in a range from 3.0 to 14.0 ppm/K, more particularly from 4.0 to 10.0 ppm/K, from 4.5 to 9.5 ppm/K, from 5.0 to 8.0 ppm/K, and/or from 5.5 to 7.5 ppm/K, as for example from 5.6 to 7.3 ppm/K or from 5.7 to 7.2 ppm/K.

The determination of do/dT may take place with a prism spectrometer (with a whole prism) which is located in a temperature chamber. Preference is given to measurement in a configuration at which the overall deflection angle becomes minimal, since in that case it is possible to calculate the refractive index only through the deflection angle and the known prism angle.

More optionally, however, dn/dT is determined by the half prism method. For this purpose the sample in the form of a half prism is introduced into a temperature-conditioned sample chamber. The prism is irradiated with light of different wavelengths and the deflection angle is determined in each case. During this procedure, the temperature in the chamber is varied. As a result, the refraction value is obtained as a function of the wavelength and of the temperature. To calculate the thermality $S(\lambda)$, the average dn/dT in a temperature range from $+20°$ C. to $+40°$ C. is optionally used. In order to minimize the extent of thermal lens effects, it is advantageous if the change in the refractive index with the temperature (dn/dT) is as small as possible, especially within a temperature range from $20°$ C. to $40°$ C. The average dn/dT at a wavelength of 436 nm, 546 nm and/or 644 nm in a temperature range from $20°$ C. to $40°$ C. is optionally in a range from 0.1 to 8.0 ppm/K, more particularly from 0.2 to 7.0 ppm/K, from 0.3 to 6.0 ppm/K and/or from 0.4 to 5.0 ppm/K, with the figures being based on the absolute value (amount) of the average dn/dT.

As described above, the induced absorption bands are accompanied by a temperature increase within the glass, and so there is a wavefront retardation and there are unwanted imaging errors if refractive index and geometric path change with the temperature. The change in the optical path with the temperature (the thermality S) is therefore optionally low. In this way, imaging errors can be minimized, even if there are induced absorption bands.

Optionally S(436 nm) is not more than 50 ppm/K, optionally not more than 30 ppm/K, optionally not more than 25 ppm/K, optionally not more than 20 ppm/K, optionally not more than 15 ppm/K, optionally not more than 10 ppm/K. In certain embodiments S(436 nm) is at least 0.1 ppm/K, at least 0.5 ppm/K, at least 1 ppm/K or at least 2 ppm/K.

Optionally S(546 nm) is not more than 50 ppm/K, optionally not more than 30 ppm/K, optionally not more than 25 ppm/K, optionally not more than 20 ppm/K, optionally not more than 15 ppm/K, optionally not more than 10 ppm/K. In certain embodiments S(546 nm) is at least 0.1 ppm/K, at least 0.5 ppm/K, at least 1 ppm/K or at least 2 ppm/K.

Optionally S(644 nm) is not more than 50 ppm/K, optionally not more than 30 ppm/K, optionally not more than 25 ppm/K, optionally not more than 20 ppm/K, optionally not more than 15 ppm/K, optionally not more than 10 ppm/K. In certain embodiments S(644 nm) is at least 0.1 ppm/K, at least 0.5 ppm/K, at least 1 ppm/K or at least 2 ppm/K.

Optionally S(436 nm), S(546 nm) and S(644 nm) are not more than 50 ppm/K, optionally not more than 30 ppm/K, optionally not more than 25 ppm/K, optionally not more than 20 ppm/K, optionally not more than 15 ppm/K, optionally not more than 10 ppm/K. In certain embodiments S(436 nm), S(546 nm) and S(644 nm) are at least 0.1 ppm/K, at least 0.5 ppm/K, at least 1 ppm/K or at least 2 ppm/K.

Further important variables are the noninduced absorbance $Abs_0$ and the induced absorbance $Abs_1$. $Abs_1(\lambda)$ describes the additional (in comparison to $Abs_0(\lambda)$) absorbance per cm at the wavelength $\lambda$ after irradiation of the sample. The induced absorbance $Abs_1$ is dependent on factors including the nature of the irradiation source. In order to evaluate the solarization stability of materials on irradiation with blue light of high intensity, irradiation with a power density of 345 $W/cm^2$ for 72 hours with laser radiation of a wavelength of 455 nm has proven advantageous. In order to achieve both a high power density and a uniform irradiation of the sample, an irradiation approach has been developed that utilizes the concept of light conduction. Prior to irradiation, the sample is optionally polished on all sides and the laser light is optionally irradiated onto the entry face (optionally $4\times4$ $mm^2$) at the angle of total internal reflection (TIR). With a 55 W laser, this produces an irradiation with a power density of 345 $W/cm^2$. "Power density" in the present disclosure refers to the "input power density" unless otherwise indicated.

The induced absorbance $Abs_1(\lambda)$ in accordance with the invention describes the additional (in comparison to $Abs_0$ $(\lambda)$) absorbance per cm at the wavelength $\lambda$ of a sample having a sample thickness d of 100 mm after irradiation with a power density of 345 $W/cm^2$ for 72 hours with laser radiation of a wavelength of 455 nm. The noninduced absorbance $Abs_0(\lambda)$, conversely, describes the absorbance per cm at the wavelength $\lambda$ of a sample having a sample thickness d of 100 mm before the irradiation. The noninduced absorbance $Abs_0(\lambda)$ and the induced absorbance $Abs_1$ $(\lambda)$ may be determined by testing the samples for their transmission using a spectrophotometer before and after irradiation, respectively.

The sample size is optionally 100 mm$\times$4 mm$\times$4 mm. The dimension of 100 mm here, as already described above, is termed the sample thickness d.

It is advantageous if $Abs_0$ and $Abs_1$ are low. The two values therefore contribute in total to the quality factor F.

A low noninduced absorbance $Abs_0$ is advantageous since accordingly, as it were, there is a low output absorbance without prior irradiation.

A low induced absorbance $Abs_1$ is likewise advantageous. It indicates that even after irradiation there is no excessive absorbance and is therefore a measure of the solarization resistance. The absorbance $Abs(\lambda)$ is described as the ratio of the natural logarithm of the ratio of incident radiation $I_0$ to emergent radiation I of wavelength $\lambda$ as dividend to the sample thickness d as divisor: $Abs(\lambda)=\ln(I_0/I)/d$. In this way it is possible to determine both $Abs_0$ and $Abs_1$. As already described above, the sample thickness d in the invention is 100 mm.

$Abs_0$(436 nm) is optionally less than 0.01/cm, optionally not more than 0.008/cm, optionally not more than 0.005/cm, optionally not more than 0.004/cm, optionally not more than 0.003/cm, optionally not more than 0.002/cm. In certain embodiments $Abs_0$(436 nm) is at least 0.0001/cm, at least 0.0002/cm, at least 0.0003/cm or at least 0.0005/cm.

$Abs_0$(546 nm) is optionally less than 0.01/cm, optionally not more than 0.008/cm, optionally not more than 0.005/cm, optionally not more than 0.004/cm, optionally not more than 0.003/cm, optionally not more than 0.002/cm, optionally less than 0.0015/cm, optionally less than 0.001/cm. In certain embodiments $Abs_0$(546 nm) is at least 0.0001/cm, at least 0.0002/cm, at least 0.0003/cm or at least 0.0005/cm.

$Abs_0$(644 nm) is optionally less than 0.01/cm, optionally not more than 0.008/cm, optionally not more than 0.005/cm, optionally not more than 0.004/cm, optionally not more than 0.003/cm, optionally not more than 0.002/cm, optionally less than 0.0015/cm. In certain embodiments $Abs_0$(644 nm) is at least 0.0001/cm, at least 0.0002/cm, at least 0.0003/cm or at least 0.0005/cm.

$Abs_0$(436 nm), $Abs_0$(546 nm) and $Abs_0$(644 nm) are optionally less than 0.01/cm, optionally not more than 0.008/cm, optionally not more than 0.005/cm, optionally not more than 0.004/cm, optionally not more than 0.003/cm, optionally not more than 0.002/cm. In certain embodiments $Abs_0$(436 nm), $Abs_0$(546 nm) and $Abs_0$(644 nm) are at least 0.0001/cm, at least 0.0002/cm, at least 0.0003/cm or at least 0.0005/cm.

$Abs_1$(436 nm) is optionally less than 0.01/cm, optionally not more than 0.0095/cm, optionally not more than 0.009/cm, optionally not more than 0.0085/cm, optionally not more than 0.008/cm, optionally not more than 0.0075/cm, optionally not more than 0.007/cm, optionally not more than 0.0065/cm, optionally not more than 0.006/cm, optionally not more than 0.0055/cm, optionally not more than 0.005/cm, optionally not more than 0.004/cm, optionally not more than 0.0035/cm, optionally not more than 0.003/cm, optionally not more than 0.0025/cm, optionally not more than 0.002/cm, optionally not more than 0.0015/cm. In certain embodiments $Abs_1$(436 nm) is at least 0.0001/cm, at least 0.0002/cm, at least 0.0005/cm, at least 0.001/cm, at least 0.0015/cm or at least 0.002/cm.

$Abs_1$(546 nm) is optionally less than 0.01/cm, optionally not more than 0.0095/cm, optionally not more than 0.009/cm, optionally not more than 0.0085/cm, optionally not more than 0.008/cm, optionally not more than 0.0075/cm, optionally not more than 0.007/cm, optionally not more than 0.0065/cm, optionally not more than 0.006/cm, optionally not more than 0.0055/cm, optionally not more than 0.005/cm, optionally not more than 0.0045/cm, optionally not more than 0.004/cm, optionally not more than 0.0035/cm, optionally not more than 0.003/cm, optionally not more than 0.0025/cm, optionally not more than 0.002/cm, optionally not more than 0.0015/cm, optionally not more than 0.001/cm. In certain embodiments $Abs_1$(546 nm) is at least 0.0001/cm, at least 0.0002/cm, at least 0.0003/cm or at least 0.0005/cm.

$Abs_1$(644 nm) is optionally less than 0.009/cm, optionally not more than 0.0085/cm, optionally not more than 0.008/cm, optionally not more than 0.0075/cm, optionally not more than 0.007/cm, optionally not more than 0.0065/cm, optionally not more than 0.006/cm, optionally not more than 0.0055/cm, optionally not more than 0.005/cm, optionally not more than 0.0045/cm, optionally not more than 0.004/cm, optionally not more than 0.003/cm, optionally not more than 0.002/cm, optionally not more than 0.0015/cm, optionally not more than 0.001/cm, optionally not more than 0.0005/cm. In certain embodiments $Abs_1$(644 nm) is at least 0.0001/cm, at least 0.0002/cm, at least 0.0003/cm or at least 0.0005/cm.

$Abs_1$(436 nm), $Abs_1$(546 nm) and $Abs_1$(644 nm) are optionally less than 0.009/cm, optionally not more than 0.0085/cm, optionally not more than 0.008/cm, optionally not more than 0.0075/cm, optionally not more than 0.007/cm, optionally not more than 0.0065/cm, optionally not more than 0.006/cm, optionally not more than 0.0055/cm, optionally not more than 0.005/cm, optionally not more than 0.0045/cm, optionally not more than 0.004/cm, optionally not more than 0.0035/cm. In certain embodiments $Abs_1$(436 nm), $Abs_1$(546 nm) and $Abs_1$(644 nm) are at least 0.0001/cm, at least 0.0002/cm, at least 0.0003/cm or at least 0.0005/cm.

Especially for use in projectors it is particularly advantageous if the induced absorbances in the blue, green and red spectral ranges are low in total. With preference:

$Abs_1$(RGB)=$Abs_1$(436 nm)+$Abs_1$(546 nm)+$Abs_1$(644 nm)<0.0310/cm. Optionally $Abs_1$(RGB) is less than 0.03/cm, optionally not more than 0.0275/cm, optionally not more than 0.025/cm, optionally not more than 0.0225/cm, optionally not more than 0.02/cm, optionally not more than 0.0175/cm, optionally not more than 0.0153/cm, optionally not more than 0.015/cm, optionally not more than 0.0125/cm, optionally not more than 0.01/cm, optionally not more than 0.009/cm, optionally not more than 0.008/cm, optionally not more than 0.007/cm, optionally not more than 0.0061/cm, optionally not more than 0.006/cm, optionally not more than 0.0057/cm, optionally not more than 0.005/cm, optionally not more than 0.004/cm, optionally not more than 0.003/cm, optionally not more than 0.0025/cm, optionally not more than 0.002/cm. In certain embodiments $Abs_1$(RGB) is at least 0.0001/cm, at least 0.0002/cm, at least 0.0003/cm, at least 0.0005/cm, or at least 0.001/cm.

A further important variable is the thermal conductivity k. The thermal conductivity is the product of density, specific heat capacity, and temperature conductivity. The density is determined optionally according to the Archimedes principle (especially ASTM C693:1993). To determine the temperature dependence of the density, the expansion behavior is determined, optionally by way of dilatometry, as described in DIN 51045-1:2005-08 and DIN ISO 7991:1998-02. The specific heat capacity is determined optionally by way of DSC (differential scanning calorimetry) in accordance with DIN 51007:2019-04. The temperature conductivity is determined optionally by way of flash analysis in accordance with ASTM E1461:2013.

A high thermal conductivity k limits the local temperature increase of the optical glass in the beam path. The thermal conductivity k is optionally more than 0.005 W/(cm*K), optionally at least 0.006 W/(cm*K), optionally at least 0.007 W/(cm*K), optionally at least 0.008 W/(cm*K), as for example at least 0.009 W/(cm*K) or at least 0.010 W/(cm*K). In certain embodiments the thermal conductivity k is not more than 0.050 W/(cm*K), not more than 0.040 W/(cm*K), not more than 0.030 W/(cm*K), not more than 0.020 W/(cm*K) or not more than 0.015 W/(cm*K).

As described above, the beam guidance elements are made of a glass which is particularly solarization-resistant on irradiation with blue light. This is advantageous for corresponding applications in projectors and in materials processing since it drastically reduces the incidence of thermal lens effects. Other aspects may additionally contribute to reducing thermal lens effects. For example, for a given local deposited heat output (through absorption of the laser light), the local temperature difference becomes smaller as the heat conduction increases, and hence the temperature-induced imaging errors become smaller as well. A high thermal conductivity k is therefore advantageous.

Depending on the field of application, the refractive index may also play a part. The refractive index at a wavelength of 436 nm, 546 nm and/or 644 nm is optionally in a range from 1.45 to 1.65.

It has been shown that a wide variety of different glass families can be used in order to obtain a glass having a quality factor in accordance with the invention. The glass is optionally selected from the group consisting of fluorophosphate glass, silicate glass, borosilicate glass, niobium phosphates, and alumino borosilicate glass. Factors of particular relevance include the refining agents used and also the purity of the raw materials used, in terms of $MnO_2$ impurities, as explained below.

The beam guidance element optionally consists of a glass including the following components in the specified proportions (in wt %):

|  | from | to |
|---|---|---|
| $SiO_2$ | 0 | 80 |
| $B_2O_3$ | 0 | 30 |
| $Al_2O_3$ | 0 | 25 |
| $Li_2O$ | 0 | 5 |
| $Na_2O$ | 0 | 20 |
| $K_2O$ | 0 | 25 |
| $MgO$ | 0 | 10 |
| $CaO$ | 0 | 20 |
| $BaO$ | 0 | 55 |
| $ZnO$ | 0 | 35 |
| $SrO$ | 0 | 25 |
| $TiO_2$ | 0 | 5 |
| $ZrO_2$ | 0 | 15 |
| $La_2O_3$ | 0 | 25 |
| $P_2O_5$ | 0 | 45 |
| $Nb_2O_5$ | 0 | 50 |
| F | 0 | 45 |
| $Sb_2O_3$ | 0 | 0.5 |
| $As_2O_3$ | 0 | <0.3 |
| $SnO_2$ | 0 | 0.5 | where at least one of the following conditions is met:
(i) $MnO_2$ amount less than 1.0 ppm (based on weight),
(ii) $SnO_2$ amount at least 0.1 wt % and Cl amount at least 0.05 wt %,
(iii) $CeO_2$ amount at least 0.005 wt %.

Optionally at least two of the conditions are met. The glass, for example, may have an $MnO_2$ amount of less than 1.0 ppm and also an $SnO_2$ amount of at least 0.1 wt % and a Cl amount of at least 0.05 wt %. The glass for example may have an $MnO_2$ amount of less than 1.0 ppm and a $CeO_2$ amount of at least 0.005 wt %. The glass for example may have an $SnO_2$ amount of at least 0.1 wt % and a Cl amount of at least 0.05 wt % and also a $CeO_2$ amount of at least 0.005 wt %.

The glass may also have an $MnO_2$ amount of less than 1.0 ppm, an $SnO_2$ amount of at least 0.1 wt %, a Cl amount of at least 0.05 wt % and a $CeO_2$ amount of at least 0.005 wt %.

It has emerged that by way of the stated measures and also by combination thereof it is possible to obtain advantages in relation to the quality factor according to the invention.

Raw materials for glass production are contaminated with $MnO_2$. It is therefore not possible to provide a glass that contains no $MnO_2$ whatsoever. Through selection of the raw materials, however, it is possible to reduce the $MnO_2$ contamination. Commercial raw materials afford glasses whose $MnO_2$ amount is at any rate more than 1.0 ppm. Through selection of particularly pure raw materials it is possible to lower the amount of $MnO_2$ to levels of less than 1.0 ppm. The amount of $MnO_2$ is optionally not more than 0.9 ppm, optionally not more than 0.8 ppm, optionally not more than 0.7 ppm, optionally not more than 0.6 ppm, optionally not more than 0.5 ppm, optionally not more than 0.4 ppm, optionally not more than 0.3 ppm, optionally not more than 0.2 ppm, optionally not more than 0.15 ppm, optionally not more than 0.1 ppm. In embodiments of the invention the $MnO_2$ amount is at least 0.01 ppm, at least 0.02 ppm or at least 0.05 ppm. The $MnO_2$ amount of the glass may be situated for example in a range from 0.01 to <1.0 ppm, from 0.01 to 0.9 ppm, from 0.01 to 0.8 ppm, from 0.01 to 0.7 ppm, from 0.01 to 0.6 ppm, from 0.01 to 0.5 ppm, from 0.01 to 0.4 ppm, from 0.01 to 0.3 ppm, from 0.01 to 0.2 ppm, from 0.01 to 0.15 ppm, from 0.01 to 0.1 ppm, from 0.02 to <1.0 ppm, from 0.02 to 0.9 ppm, from 0.02 to 0.8 ppm, from 0.02 to 0.7 ppm, from 0.02 to 0.6 ppm, from 0.02 to 0.5 ppm, from 0.02 to 0.4 ppm, from 0.02 to 0.3 ppm, from 0.02 to 0.2 ppm, from 0.02 to 0.15 ppm, from 0.02 to 0.1 ppm, from 0.05 to <1.0 ppm, from 0.05 to 0.9 ppm, from 0.05 to 0.8 ppm, from 0.05 to 0.7 ppm, from 0.05 to 0.6 ppm, from 0.05 to 0.5 ppm, from 0.05 to 0.4 ppm, from 0.05 to 0.3 ppm, from 0.05 to 0.2 ppm, from 0.05 to 0.15 ppm, or from 0.05 to 0.1 ppm.

The quality factor can also be improved via Sn/Cl refining. In this case a relatively high $SnO_2$ amount in particular has emerged as being advantageous. The $SnO_2$ amount of the glass is optionally at least 0.1 wt %, optionally at least 0.15 wt %, optionally at least 0.2 wt %, optionally at least 0.25 wt %, optionally at least 0.3 wt %, optionally at least 0.35 wt %, optionally at least 0.4 wt %. The Cl amount of the glass is optionally at least 0.05 wt %, optionally at least 0.1 wt %. The glass optionally has an $SnO_2$ amount of at least 0.3 wt % and a Cl amount of at least 0.05 wt %, optionally an $SnO_2$ amount of at least 0.4 wt % and a Cl amount of at least 0.1 wt %. In embodiments of the invention the $SnO_2$ amount is not more than 1.0 wt % or not more than 0.5 wt % and/or the Cl amount is not more than 1.0 wt % or not more than 0.5 wt %. The $SnO_2$ amount may be situated for example in a range from 0.1 wt % to 1.0 wt % and/or the Cl amount in a range from 0.05 wt % to 1.0 wt %. The $SnO_2$ amount is optionally not more than 1.0 wt %, as for example not more than 0.75 wt %, not more than 0.5 wt % or not more than 0.45 wt %. Very high $SnO_2$ contents may increase the crystallization tendency. The Cl amount is optionally not more than 1.0 wt %, as for example not more than 0.75 wt %, not more than 0.5 wt %, not more than 0.45 wt % or not more than 0.4 wt %. Very high Cl contents may cause tank corrosion or destabilize the glass.

The ratio of the weight amount of $SnO_2$ to the weight amount of Cl is optionally in a range from 1:5 to 5:1, as for example from 1:4 to 4:1, from 1:3 to 3:1, from 1:2 to 2:1 or from 1:1.5 to 1.5:1. A particularly good quality factor can be achieved accordingly. With particular preference the amount of $SnO_2$ is less than the amount of Cl.

The quality factor can also be improved using $CeO_2$. $CeO_2$ does lead undesirably to an increase in the $Abs_0$ values. Surprisingly, however, it has been found that $CeO_2$ in small proportions can improve the solarization resistance in such a way that the reduction in the $Abs_1$ values overcompensates the increase in the $Abs_0$ values, thereby improving the quality factor. The $CeO_2$ amount is optionally at least 0.005 wt %, optionally at least 0.01 wt %. The $CeO_2$ amount is optionally not more than 0.05 wt % or not more than 0.04 wt %. The $CeO_2$ amount is situated optionally in a range from 0.005 wt % to 0.05 wt %, as for example from 0.01 wt % to 0.04 wt %.

Particularly in embodiments in which the glass contains $CeO_2$ in an amount of at least 0.005 wt % or at least 0.01 wt %, the glass contains optionally less than 0.3 wt %, optionally not more than 0.2 wt %, optionally not more than 0.1 wt % of $TiO_2$, or with particular preference, indeed, is free from $TiO_2$.

The glass of the invention may be a fluorophosphate glass for example. One particularly optional fluorophosphate glass of the invention includes the following components in the proportions indicated (in wt %):

|  | from | to |
|---|---|---|
| $SiO_2$ | 0 | 5 |
| $B_2O_3$ | 0 | 5 |
| $Al_2O_3$ | 5 | 25 |
| $Li_2O$ | 0 | 5 |

-continued

| | from | to |
|---|---|---|
| $Na_2O$ | 0 | 5 |
| $K_2O$ | 0 | 5 |
| MgO | 1 | 10 |
| CaO | 5 | 20 |
| BaO | 10 | 30 |
| ZnO | 0 | 5 |
| SrO | 10 | 25 |
| $TiO_2$ | 0 | 5 |
| $ZrO_2$ | 0 | 5 |
| $La_2O_3$ | 0 | 5 |
| $P_2O_5$ | 5 | 15 |
| F | 15 | 45 |
| $Sb_2O_3$ | 0 | 0.5 |
| $As_2O_3$ | 0 | <0.3 |
| $SnO_2$ | 0 | 0.5 | where at least one of the following conditions is met:
(i) $MnO_2$ amount less than 1.0 ppm (based on weight),
(ii) $SnO_2$ amount at least 0.1 wt % and Cl amount at least 0.05 wt %,
(iii) $CeO_2$ amount at least 0.005 wt %.

Optionally at least two of the conditions are met. The fluorophosphate glass, for example, may have an $MnO_2$ amount of less than 1.0 ppm and also an $SnO_2$ amount of at least 0.1 wt % and a Cl amount of at least 0.05 wt %. The fluorophosphate glass for example may have an $MnO_2$ amount of less than 1.0 ppm and a $CeO_2$ amount of at least 0.005 wt %. The fluorophosphate glass for example may have an $SnO_2$ amount of at least 0.1 wt % and a Cl amount of at least 0.05 wt % and also a $CeO_2$ amount of at least 0.005 wt %.

The fluorophosphate glass may also have an $MnO_2$ amount of less than 1.0 ppm, an $SnO_2$ amount of at least 0.1 wt %, a Cl amount of at least 0.05 wt % and a $CeO_2$ amount of at least 0.005 wt %.

It has emerged that by way of the stated measures and also by combination thereof it is possible to obtain advantages in relation to the quality factor according to the invention.

Raw materials for glass production are contaminated with $MnO_2$. It is therefore not possible to provide a fluorophosphate glass that contains no $MnO_2$ whatsoever. Through selection of the raw materials, however, it is possible to reduce the $MnO_2$ contamination. Commercial raw materials afford glasses whose $MnO_2$ amount is at any rate more than 1.0 ppm. Through selection of particularly pure raw materials, it is possible to lower the amount of $MnO_2$ to levels of less than 1.0 ppm. The amount of $MnO_2$ is optionally not more than 0.9 ppm, optionally not more than 0.8 ppm, optionally not more than 0.7 ppm, optionally not more than 0.6 ppm, optionally not more than 0.5 ppm, optionally not more than 0.4 ppm, optionally not more than 0.3 ppm, optionally not more than 0.2 ppm, optionally not more than 0.15 ppm, optionally not more than 0.1 ppm. In embodiments of the invention the $MnO_2$ amount is at least 0.01 ppm, at least 0.02 ppm or at least 0.05 ppm. The $MnO_2$ amount of the fluorophosphate glass may be situated for example in a range from 0.01 to <1.0 ppm, from 0.01 to 0.9 ppm, from 0.01 to 0.8 ppm, from 0.01 to 0.7 ppm, from 0.01 to 0.6 ppm, from 0.01 to 0.5 ppm, from 0.01 to 0.4 ppm, from 0.01 to 0.3 ppm, from 0.01 to 0.2 ppm, from 0.01 to 0.15 ppm, from 0.01 to 0.1 ppm, from 0.02 to <1.0 ppm, from 0.02 to 0.9 ppm, from 0.02 to 0.8 ppm, from 0.02 to 0.7 ppm, from 0.02 to 0.6 ppm, from 0.02 to 0.5 ppm, from 0.02 to 0.4 ppm, from 0.02 to 0.3 ppm, from 0.02 to 0.2 ppm, from 0.02 to 0.15 ppm, from 0.02 to 0.1 ppm, from 0.05 to <1.0 ppm, from 0.05 to 0.9 ppm, from 0.05 to 0.8 ppm, from 0.05 to 0.7 ppm, from 0.05 to 0.6 ppm, from 0.05 to 0.5 ppm, from 0.05 to 0.4 ppm, from 0.05 to 0.3 ppm, from 0.05 to 0.2 ppm, from 0.05 to 0.15 ppm, or from 0.05 to 0.1 ppm.

The quality factor can also be improved via Sn/Cl refining. In this case a relatively high $SnO_2$ amount in particular has emerged as being advantageous. The $SnO_2$ amount of the fluorophosphate glass is optionally at least 0.1 wt %, optionally at least 0.15 wt %, optionally at least 0.2 wt %, optionally at least 0.25 wt %, optionally at least 0.3 wt %, optionally at least 0.35 wt %, more optionally at least 0.4 wt %. The Cl amount of the fluorophosphate glass is optionally at least 0.05 wt %, optionally at least 0.1 wt %. The fluorophosphate glass optionally has an $SnO_2$ amount of at least 0.3 wt % and a Cl amount of at least 0.05 wt %, optionally an $SnO_2$ amount of at least 0.4 wt % and a Cl amount of at least 0.1 wt %. In embodiments of the invention the $SnO_2$ amount is not more than 1.0 wt % or not more than 0.5 wt % and/or the Cl amount is not more than 1.0 wt % or not more than 0.5 wt %. The $SnO_2$ amount may be situated for example in a range from 0.1 wt % to 1.0 wt % and/or the Cl amount in a range from 0.05 wt % to 1.0 wt %. The $SnO_2$ amount is optionally not more than 1.0 wt %, as for example not more than 0.75 wt %, not more than 0.5 wt % or not more than 0.45 wt %. Very high $SnO_2$ contents may increase the crystallization tendency. The Cl amount is optionally not more than 1.0 wt %, as for example not more than 0.75 wt %, not more than 0.5 wt %, not more than 0.45 wt % or not more than 0.4 wt %. Very high Cl contents may cause tank corrosion or destabilize the glass.

The ratio of the amount of $SnO_2$ to the amount of Cl is optionally in a range from 1:5 to 5:1, as for example from 1:4 to 4:1, from 1:3 to 3:1, from 1:2 to 2:1 or from 1:1.5 to 1.5:1. A particularly good quality factor can be achieved accordingly. With particular preference the amount of $SnO_2$ is less than the amount of Cl.

The quality factor can also be improved using $CeO_2$. $CeO_2$ does lead undesirably to an increase in the $Abs_0$ values. Surprisingly, however, it has been found that $CeO_2$ in small proportions can improve the solarization resistance in such a way that the reduction in the $Abs_1$ values overcompensates the increase in the $Abs_0$ values, thereby improving the quality factor. The $CeO_2$ amount is optionally at least 0.005 wt %, more optionally at least 0.01 wt %. The $CeO_2$ amount is optionally not more than 0.05 wt % or not more than 0.04 wt %. The $CeO_2$ amount is situated optionally in a range from 0.005 wt % to 0.05 wt %, as for example from 0.01 wt % to 0.04 wt %.

The fluorophosphate glass of the invention contains optionally less than 0.3 wt %, optionally not more than 0.2 wt %, optionally not more than 0.1 wt % of each of the components $SiO_2$, $B_2O_3$, $Li_2O$, $Na_2O$, $K_2O$, ZnO, $TiO_2$, $ZrO_2$, $La_2O_3$, $Sb_2O_3$, and $As_2O_3$ or with particular preference, indeed, is free from these components. Particularly in embodiments in which the fluorophosphate glass contains $CeO_2$ in an amount of at least 0.005 wt % or at least 0.01 wt %, the glass contains optionally less than 0.3 wt %, optionally not more than 0.2 wt %, optionally not more than 0.1 wt % of $TiO_2$, or with particular preference, indeed, is free from $TiO_2$.

The fluorophosphate glass optionally contains $Al_2O_3$ in an amount of 7.5 to 22.5 wt %, optionally of 10 to 20 wt %, optionally of 14 to 19 wt %. The $Al_2O_3$ amount may be, for example, at least 7.5 wt %, at least 10 wt % or at least 14 wt %. The $Al_2O_3$ amount may be, for example, not more than 22.5 wt %, not more than 20 wt % or not more than 19 wt %.

The fluorophosphate glass optionally contains MgO in an amount of 1.5 to 7.5 wt %, optionally from 2 to 5 wt %, optionally from 2.5 to 3.5 wt %. The MgO amount may be, for example, at least 1.5 wt %, at least 2 wt % or at least 2.5 wt %. The MgO amount may be, for example, not more than 7.5 wt %, not more than 5 wt % or not more than 3.5 wt %.

The fluorophosphate glass optionally contains CaO in an amount of 7.5 to 15 wt %, optionally from 9 to 14 wt %, optionally from 10 to 13 wt %. The CaO amount may be, for example, at least 7.5 wt %, at least 9 wt % or at least 10 wt %. The MgO amount may be, for example, not more than 15 wt %, not more than 14 wt % or not more than 13 wt %.

The fluorophosphate glass optionally contains BaO in an amount of 11 to 25 wt %, optionally from 12 to 20 wt %, optionally from 13 to 17 wt %. The BaO amount may be, for example, at least 11 wt %, at least 12 wt % or at least 13 wt %. The BaO amount may be, for example, not more than 25 wt %, not more than 20 wt % or not more than 17 wt %.

The fluorophosphate glass optionally contains SrO in an amount of 15 to 24 wt %, optionally from 16 to 23 wt %, optionally from 16.5 to 22 wt %. The SrO amount may be, for example, at least 15 wt %, at least 16 wt % or at least 16.5 wt %. The SrO amount may be, for example, not more than 24 wt %, not more than 23 wt % or not more than 22 wt %.

The fluorophosphate glass optionally contains $P_2O_5$ in an amount of 6 to 12 wt %, optionally from 7 to 11 wt %, optionally from 8 to 10 wt %. The $P_2O_5$ amount may be, for example, at least 6 wt %, at least 7 wt % or at least 8 wt %. The $P_2O_5$ amount may be, for example, not more than 12 wt %, not more than 11 wt % or not more than 10 wt %.

The fluorophosphate glass optionally contains F in an amount of 20 to 40 wt %, optionally from 25 to 35 wt %, optionally from 27.5 to 32.5 wt %. The F amount may be, for example, at least 20 wt %, at least 25 wt % or at least 27.5 wt %. The F amount may be, for example, not more than 40 wt %, not more than 35 wt % or not more than 32.5 wt %.

The glass of the invention may be a silicate glass for example. One particularly optional silicate glass of the invention includes the following components in the proportions indicated (in wt %):

| | from | to |
|---|---|---|
| $SiO_2$ | 30 | 55 |
| $B_2O_3$ | 0 | 5 |
| $Al_2O_3$ | 0 | 5 |
| $Li_2O$ | 0.1 | 5 |
| $Na_2O$ | 1 | 20 |
| $K_2O$ | 0.5 | 15 |
| MgO | 0 | 5 |
| CaO | 0 | 5 |
| BaO | 1 | 30 |
| ZnO | 2 | 35 |
| SrO | 0 | 5 |
| $TiO_2$ | 0 | 5 |
| $ZrO_2$ | 1 | 15 |
| $La_2O_3$ | 1 | 25 |
| $P_2O_5$ | 0 | 5 |
| F | 0 | 5 |
| $Sb_2O_3$ | 0 | 0.5 |
| $As_2O_3$ | 0 | <0.3 |
| $SnO_2$ | 0 | 0.5 | where at least one of the following conditions is met:
(i) $MnO_2$ amount less than 1.0 ppm (based on weight),
(ii) $SnO_2$ amount at least 0.1 wt % and Cl amount at least 0.05 wt %,
(iii) $CeO_2$ amount at least 0.005 wt %.

Optionally at least two of the conditions are met. The silicate glass, for example, may have an $MnO_2$ amount of less than 1.0 ppm and also an $SnO_2$ amount of at least 0.1 wt % and a Cl amount of at least 0.05 wt %. The silicate glass for example may have an $MnO_2$ amount of less than 1.0 ppm and a $CeO_2$ amount of at least 0.005 wt %. The silicate glass for example may have an $SnO_2$ amount of at least 0.1 wt % and a Cl amount of at least 0.05 wt % and also a $CeO_2$ amount of at least 0.005 wt %.

The silicate glass may also have an $MnO_2$ amount of less than 1.0 ppm, an $SnO_2$ amount of at least 0.1 wt %, a Cl amount of at least 0.05 wt % and a $CeO_2$ amount of at least 0.005 wt %.

It has emerged that by way of the stated measures and also by combination thereof it is possible to obtain advantages in relation to the quality factor according to the invention.

Raw materials for glass production are contaminated with $MnO_2$. It is therefore not possible to provide a silicate glass that contains no $MnO_2$ whatsoever. Through selection of the raw materials, however, it is possible to reduce the $MnO_2$ contamination. Commercial raw materials afford glasses whose $MnO_2$ amount is at any rate more than 1.0 ppm. Through selection of particularly pure raw materials it is possible to lower the amount of $MnO_2$ to levels of less than 1.0 ppm. The amount of $MnO_2$ is optionally not more than 0.9 ppm, optionally not more than 0.8 ppm, optionally not more than 0.7 ppm, optionally not more than 0.6 ppm, optionally not more than 0.5 ppm, optionally not more than 0.4 ppm, optionally not more than 0.3 ppm, optionally not more than 0.2 ppm, optionally not more than 0.15 ppm, optionally not more than 0.1 ppm. In embodiments of the invention the $MnO_2$ amount is at least 0.01 ppm, at least 0.02 ppm or at least 0.05 ppm. The $MnO_2$ amount of the silicate glass may be situated for example in a range from 0.01 to <1.0 ppm, from 0.01 to 0.9 ppm, from 0.01 to 0.8 ppm, from 0.01 to 0.7 ppm, from 0.01 to 0.6 ppm, from 0.01 to 0.5 ppm, from 0.01 to 0.4 ppm, from 0.01 to 0.3 ppm, from 0.01 to 0.2 ppm, from 0.01 to 0.15 ppm, from 0.01 to 0.1 ppm, from 0.02 to <1.0 ppm, from 0.02 to 0.9 ppm, from 0.02 to 0.8 ppm, from 0.02 to 0.7 ppm, from 0.02 to 0.6 ppm, from 0.02 to 0.5 ppm, from 0.02 to 0.4 ppm, from 0.02 to 0.3 ppm, from 0.02 to 0.2 ppm, from 0.02 to 0.15 ppm, from 0.02 to 0.1 ppm, from 0.05 to <1.0 ppm, from 0.05 to 0.9 ppm, from 0.05 to 0.8 ppm, from 0.05 to 0.7 ppm, from 0.05 to 0.6 ppm, from 0.05 to 0.5 ppm, from 0.05 to 0.4 ppm, from 0.05 to 0.3 ppm, from 0.05 to 0.2 ppm, from 0.05 to 0.15 ppm, or from 0.05 to 0.1 ppm.

The quality factor can also be improved via Sn/Cl refining. In this case a relatively high $SnO_2$ amount in particular has emerged as being advantageous. The $SnO_2$ amount of the silicate glass is optionally at least 0.1 wt %, optionally at least 0.15 wt %, optionally at least 0.2 wt %, optionally at least 0.25 wt %, optionally at least 0.3 wt %, optionally at least 0.35 wt %, optionally at least 0.4 wt %. The Cl amount of the silicate glass is optionally at least 0.05 wt %, optionally at least 0.1 wt %. The silicate glass optionally has an $SnO_2$ amount of at least 0.3 wt % and a Cl amount of at least 0.05 wt %, optionally an $SnO_2$ amount of at least 0.4 wt % and a Cl amount of at least 0.1 wt %. In embodiments of the invention the $SnO_2$ amount is not more than 1.0 wt % or not more than 0.5 wt % and/or the Cl amount is not more than 1.0 wt % or not more than 0.5 wt %. The $SnO_2$ amount may be situated for example in a range from 0.1 wt % to 1.0 wt % and/or the Cl amount in a range from 0.05 wt % to 1.0 wt %. The $SnO_2$ amount is optionally not more than 1.0 wt %, as for example not more than 0.75 wt %, not more than 0.5 wt % or not more than 0.45 wt %. Very high $SnO_2$ contents may increase the crystallization tendency. The Cl amount is optionally not more than 1.0 wt %, as for example not more than 0.75 wt %, not more than 0.5 wt %, not more than 0.45 wt % or not more than 0.4 wt %. Very high Cl contents may cause tank corrosion or destabilize the glass.

The ratio of the weight amount of $SnO_2$ to the weight amount of Cl is optionally in a range from 1:5 to 5:1, as for example from 1:4 to 4:1, from 1:3 to 3:1, from 1:2 to 2:1 or from 1:1.5 to 1.5:1. A particularly good quality factor can be achieved accordingly. With particular preference the amount of $SnO_2$ is less than the amount of Cl.

The quality factor can also be improved using $CeO_2$. $CeO_2$ does lead undesirably to an increase in the $Abs_0$ values. Surprisingly, however, it has been found that $CeO_2$ in small proportions can improve the solarization resistance in such a way that the reduction in the $Abs_1$ values overcompensates the increase in the $Abs_0$ values, thereby improving the quality factor. The $CeO_2$ amount is optionally at least 0.005 wt % or at least 0.01 wt %. The $CeO_2$ amount is optionally not more than 0.05 wt % or not more than 0.04 wt %. The $CeO_2$ amount is situated optionally in a range from 0.005 wt % to 0.05 wt %, as for example from 0.01 wt % to 0.04 wt %.

The silicate glass of the invention contains optionally less than 0.3 wt %, optionally not more than 0.2 wt %, optionally not more than 0.1 wt % of each of the components $B_2O_3$, $Al_2O_3$, MgO, CaO, SrO, $TiO_2$, $P_2O_5$, F, $Sb_2O_3$ and $As_2O_3$ or with particular preference, indeed, is free from these components. Particularly in embodiments in which the silicate glass contains $CeO_2$ in an amount of at least 0.005 wt % or at least 0.01 wt %, the glass contains optionally less than 0.3 wt %, optionally not more than 0.2 wt %, optionally not more than 0.1 wt % of $TiO_2$, or with particular preference, indeed, is free from $TiO_2$.

The silicate glass optionally contains $SiO_2$ in an amount of 35 to 50 wt %, optionally from 37.5 to 47.5 wt %, optionally from 40 to 45 wt %. The $SiO_2$ amount may be, for example, at least 35 wt %, at least 37.5 wt % or at least 40 wt %. The $SiO_2$ amount may be, for example, not more than 50 wt %, not more than 47.5 wt % or not more than 45 wt %.

The silicate glass optionally contains $Li_2O$ in an amount of 0.2 to 4 wt %, optionally from 0.4 to 2 wt %, optionally from 0.5 to 1.5 wt %. The $Li_2O$ amount may be, for example, at least 0.2 wt %, at least 0.4 wt % or at least 0.5 wt %. The $Li_2O$ amount may be, for example, not more than 4 wt %, not more than 2 wt % or not more than 1.5 wt %.

The silicate glass optionally contains $Na_2O$ in an amount of 2 to 15 wt %, optionally from 3 to 10 wt %, optionally from 4 to 7.5 wt %. The $Na_2O$ amount may be, for example, at least 2 wt %, at least 3 wt % or at least 4 wt %. The $Na_2O$ amount may be, for example, not more than 15 wt %, not more than 10 wt % or not more than 7.5 wt %.

The silicate glass optionally contains $K_2O$ in an amount of 1 to 10 wt %, optionally from 1.5 to 7.5 wt %, optionally from 2 to 5 wt %. The $K_2O$ amount may be, for example, at least 1 wt %, at least 1.5 wt % or at least 2 wt % The $K_2O$ amount may be, for example, not more than 10 wt %, not more than 7.5 wt % or not more than 5 wt %.

The sum total of the amounts of the alkali metal oxides ($R_2O$) in the silicate glass is optionally in a range from 1 to 20 wt %, optionally from 2 to 15 wt %, optionally from 5 to 12.5 wt %. The $R_2O$ amount may be, for example, at least 1 wt %, at least 2 wt % or at least 5 wt %. The $R_2O$ amount may be, for example, not more than 20 wt %, not more than 15 wt % or not more than 12.5 wt %. The glass optionally contains no alkali metal oxides other than $Li_2O$, $Na_2O$ and/or $K_2O$.

The silicate glass optionally contains BaO in an amount of 2 to 25 wt %, optionally from 5 to 20 wt %, optionally from 7.5 to 15 wt %. The BaO amount may be, for example, at least 2 wt %, at least 5 wt % or at least 7.5 wt %. The BaO amount may be, for example, not more than 25 wt %, not more than 20 wt % or not more than 15 wt %.

The silicate glass optionally contains ZnO in an amount of 5 to 30 wt %, optionally from 10 to 27.5 wt %, optionally from 15 to 25 wt %. The ZnO amount may be, for example, at least 5 wt %, at least 10 wt % or at least 15 wt %. The ZnO amount may be, for example, not more than 30 wt %, not more than 27.5 wt % or not more than 25 wt %.

The silicate glass optionally contains $ZrO_2$ in an amount of 1.5 to 10 wt %, optionally from 2 to 8.5 wt %, optionally from 3 to 7 wt %. The $ZrO_2$ amount may be, for example, at least 1.5 wt %, at least 2 wt % or at least 3 wt %. The $ZrO_2$ amount may be, for example, not more than 10 wt %, not more than 8.5 wt % or not more than 7 wt %.

The silicate glass optionally contains $La_2O_3$ in an amount of 2 to 20 wt %, optionally from 5 to 15 wt %, optionally from 7.5 to 12.5 wt %. The $La_2O_3$ amount may be, for example, at least 2 wt %, at least 5 wt % or at least 7.5 wt %. The $La_2O_3$ amount may be, for example, not more than 20 wt %, not more than 15 wt % or not more than 12.5 wt %.

The glass of the invention may be a borosilicate glass for example. One particularly optional borosilicate glass of the invention includes the following components in the proportions indicated (in wt %):

|  | from | to |
|---|---|---|
| $SiO_2$ | 50 | 80 |
| $B_2O_3$ | 2 | 30 |
| $Al_2O_3$ | 0 | 5 |
| $Li_2O$ | 0 | 5 |
| $Na_2O$ | 0 | 20 |
| $K_2O$ | 1 | 25 |
| MgO | 0 | 5 |
| CaO | 0 | 10 |
| BaO | 0 | 10 |
| ZnO | 0 | 5 |
| SrO | 0 | 5 |
| $TiO_2$ | 0 | 5 |
| $ZrO_2$ | 0 | 5 |
| $La_2O_3$ | 0 | 5 |
| $P_2O_5$ | 0 | 5 |
| F | 0 | 20 |
| $Sb_2O_3$ | 0 | 0.5 |
| $As_2O_3$ | 0 | <0.3 |
| $SnO_2$ | 0 | 0.5 | where at least one of the following conditions is met:
(i) $MnO_2$ amount less than 1.0 ppm (based on weight),
(ii) $SnO_2$ amount at least 0.1 wt % and Cl amount at least 0.05 wt %,
(iii) $CeO_2$ amount at least 0.005 wt %.

Optionally at least two of the conditions are met. The borosilicate glass, for example, may have an $MnO_2$ amount of less than 1.0 ppm and also an $SnO_2$ amount of at least 0.1 wt % and a Cl amount of at least 0.05 wt %. The borosilicate glass for example may have an $MnO_2$ amount of less than 1.0 ppm and a $CeO_2$ amount of at least 0.005 wt %. The borosilicate glass for example may have an $SnO_2$ amount of at least 0.1 wt % and a Cl amount of at least 0.05 wt % and also a $CeO_2$ amount of at least 0.005 wt %.

The borosilicate glass may also have an $MnO_2$ amount of less than 1.0 ppm, an $SnO_2$ amount of at least 0.1 wt %, a Cl amount of at least 0.05 wt % and a $CeO_2$ amount of at least 0.005 wt %.

It has emerged that by way of the stated measures and also by combination thereof it is possible to obtain advantages in relation to the quality factor according to the invention.

Raw materials for glass production are contaminated with $MnO_2$. It is therefore not possible to provide a borosilicate glass that contains no $MnO_2$ whatsoever. Through selection of the raw materials, however, it is possible to reduce the $MnO_2$ contamination. Commercial raw materials afford glasses whose $MnO_2$ amount is at any rate more than 1.0 ppm. Through selection of particularly pure raw materials it is possible to lower the amount of $MnO_2$ to levels of less than 1.0 ppm. The amount of $MnO_2$ is optionally not more than 0.9 ppm, optionally not more than 0.8 ppm, optionally not more than 0.7 ppm, optionally not more than 0.6 ppm, optionally not more than 0.5 ppm, optionally not more than 0.4 ppm, optionally not more than 0.3 ppm, optionally not more than 0.2 ppm, optionally not more than 0.15 ppm, more optionally not more than 0.1 ppm. In embodiments of the invention the $MnO_2$ amount is at least 0.01 ppm, at least 0.02 ppm or at least 0.05 ppm. The $MnO_2$ amount of the borosilicate glass may be situated for example in a range from 0.01 to <1.0 ppm, from 0.01 to 0.9 ppm, from 0.01 to 0.8 ppm, from 0.01 to 0.7 ppm, from 0.01 to 0.6 ppm, from 0.01 to 0.5 ppm, from 0.01 to 0.4 ppm, from 0.01 to 0.3 ppm, from 0.01 to 0.2 ppm, from 0.01 to 0.15 ppm, from 0.01 to 0.1 ppm, from 0.02 to <1.0 ppm, from 0.02 to 0.9 ppm, from 0.02 to 0.8 ppm, from 0.02 to 0.7 ppm, from 0.02 to 0.6 ppm, from 0.02 to 0.5 ppm, from 0.02 to 0.4 ppm, from 0.02 to 0.3 ppm, from 0.02 to 0.2 ppm, from 0.02 to 0.15 ppm, from 0.02 to 0.1 ppm, from 0.05 to <1.0 ppm, from 0.05 to 0.9 ppm, from 0.05 to 0.8 ppm, from 0.05 to 0.7 ppm, from 0.05 to 0.6 ppm, from 0.05 to 0.5 ppm, from 0.05 to 0.4 ppm, from 0.05 to 0.3 ppm, from 0.05 to 0.2 ppm, from 0.05 to 0.15 ppm, or from 0.05 to 0.1 ppm.

The quality factor can also be improved via Sn/Cl refining. In this case a relatively high $SnO_2$ amount in particular has emerged as being advantageous. The $SnO_2$ amount of the borosilicate glass is optionally at least 0.1 wt %, optionally at least 0.15 wt %, optionally at least 0.2 wt %, optionally at least 0.25 wt %, optionally at least 0.3 wt %, optionally at least 0.35 wt %, optionally at least 0.4 wt %. The Cl amount of the borosilicate glass is optionally at least 0.05 wt %, optionally at least 0.1 wt %. The borosilicate glass optionally has an $SnO_2$ amount of at least 0.3 wt % and a Cl amount of at least 0.05 wt %, optionally an $SnO_2$ amount of at least 0.4 wt % and a Cl amount of at least 0.1 wt %. In embodiments of the invention the $SnO_2$ amount is not more than 1.0 wt % or not more than 0.5 wt % and/or the Cl amount is not more than 1.0 wt % or not more than 0.5 wt %. The $SnO_2$ amount may be situated for example in a range from 0.1 wt % to 1.0 wt % and/or the Cl amount in a range from 0.05 wt % to 1.0 wt %. The $SnO_2$ amount is optionally not more than 1.0 wt %, as for example not more than 0.75 wt %, not more than 0.5 wt % or not more than 0.45 wt %. Very high $SnO_2$ contents may increase the crystallization tendency. The Cl amount is optionally not more than 1.0 wt %, as for example not more than 0.75 wt %, not more than 0.5 wt %, not more than 0.45 wt % or not more than 0.4 wt %. Very high Cl contents may cause tank corrosion or destabilize the glass.

The ratio of the weight amount of $SnO_2$ to the weight amount of Cl is optionally in a range from 1:5 to 5:1, as for example from 1:4 to 4:1, from 1:3 to 3:1, from 1:2 to 2:1 or from 1:1.5 to 1.5:1. A particularly good quality factor can be achieved accordingly. With particular preference the amount of $SnO_2$ is less than the amount of Cl.

The quality factor can also be improved using $CeO_2$. $CeO_2$ does lead undesirably to an increase in the $Abs_0$ values. Surprisingly, however, it has been found that $CeO_2$ in small proportions can improve the solarization resistance in such a way that the reduction in the $Abs_1$ values overcompensates the increase in the $Abs_0$ values, thereby improving the quality factor. The $CeO_2$ amount is optionally at least 0.005 wt %, optionally at least 0.01 wt %. The $CeO_2$ amount is optionally not more than 0.05 wt % or not more than 0.04 wt %. The $CeO_2$ amount is situated optionally in a range from 0.005 wt % to 0.05 wt %, as for example from 0.01 wt % to 0.04 wt %.

The borosilicate glass of the invention contains optionally less than 0.3 wt %, optionally not more than 0.2 wt %, optionally not more than 0.1 wt % of each of the components $Al_2O_3$, $Li_2O$, MgO, ZnO, SrO, $ZrO_2$, $La_2O_3$, $P_2O_5$, and $As_2O_3$ or with particular preference, indeed, is free from these components. Particularly in embodiments in which the borosilicate glass contains $CeO_2$ in an amount of at least 0.005 wt % or at least 0.01 wt %, the glass contains optionally less than 0.3 wt %, optionally not more than 0.2 wt %, optionally not more than 0.1 wt % of $TiO_2$, or with particular preference, indeed, is free from $TiO_2$.

The borosilicate glass optionally contains $SiO_2$ in an amount of 52.5 to 77.5 wt %, optionally from 55 to 75 wt %, optionally from 57.5 to 72.5 wt %. The $SiO_2$ amount may be, for example, at least 52.5 wt %, at least 55 wt % or at least 57.5 wt %. The $SiO_2$ amount may be, for example, not more than 77.5 wt %, not more than 75 wt % or not more than 72.5 wt %.

The borosilicate glass optionally contains $B_2O_3$ in an amount of 5 to 25 wt %, optionally from 7.5 to 20 wt %, optionally from 9 to 19 wt %. The $B_2O_3$ amount may be, for example, at least 5 wt %, at least 7.5 wt % or at least 9 wt %. The $B_2O_3$ amount may be, for example, not more than 25 wt %, not more than 20 wt % or not more than 19 wt %.

The borosilicate glass optionally contains $Na_2O$ in an amount of 0 to 17.5 wt %, optionally from 0 to 15 wt %, optionally from 0 to 12.5 wt %. In certain embodiments the glass contains at least 2 wt %, at least 5 wt % or even at least 8 wt % of $Na_2O$. The $Na_2O$ amount may be, for example, not more than 17.5 wt %, not more than 15 wt % or not more than 12.5 wt %.

The borosilicate glass optionally contains $K_2O$ in an amount of 2 to 24 wt %, optionally from 4 to 23 wt %, optionally from 6 to 22 wt %. The $K_2O$ amount may be, for example, at least 2 wt %, at least 4 wt % or at least 6 wt %. The $K_2O$ amount may be, for example, not more than 24 wt %, not more than 23 wt % or not more than 22 wt %.

The sum total of the amounts of the alkali metal oxides ($R_2O$) in the borosilicate glass is optionally in a range from 5 to 30 wt %, optionally from 10 to 25 wt %, optionally from 15 to 22 wt %. The $R_2O$ amount may be, for example, at least 5 wt %, at least 10 wt % or at least 15 wt %. The $R_2O$ amount may be, for example, not more than 30 wt %, not more than 25 wt % or not more than 22 wt %. The glass optionally contains no alkali metal oxides other than $Na_2O$ and/or $K_2O$.

The borosilicate glass optionally contains CaO in an amount of 0 to 5 wt %, optionally from 0 to 2 wt %, optionally from 0 to 1 wt %. In certain embodiments the glass contains at least 0.1 wt % or at least 0.2 wt % of CaO. The CaO amount may be, for example, not more than 5 wt %, not more than 2 wt % or not more than 1 wt %.

The borosilicate glass optionally contains BaO in an amount of 0 to 5 wt %, optionally from 0 to 3.5 wt %, optionally from 0 to 2 wt %. In certain embodiments the glass contains at least 0.1 wt % of BaO. The BaO amount may be, for example, not more than 5 wt %, not more than 3.5 wt % or not more than 2 wt %.

The borosilicate glass optionally contains $TiO_2$ in an amount of 0 to 2 wt %, optionally from 0 to 1 wt %, optionally from 0 to 0.5 wt %. In certain embodiments the glass contains at least 0.1 wt % of $TiO_2$. The $TiO_2$ amount may be, for example, not more than 2 wt %, not more than 1 wt % or not more than 0.5 wt %.

The borosilicate glass optionally contains F in an amount of 0 to 15 wt %, optionally from 0 to 12.5 wt %, optionally from 0 to 10 wt %. In certain embodiments the glass contains at least 1 wt %, at least 2 wt % or even at least 5 wt % of F. The F amount may be, for example, not more than 15 wt %, not more than 12.5 wt % or not more than 10 wt %.

The borosilicate glass may contain $Sb_2O_3$ in an amount of 0.01 to 0.45 wt %, optionally of 0.01 to 0.4 wt %, optionally of 0.01 to 0.35 wt %.

The glass of the invention may be an alumino borosilicate glass for example. One particularly optional alumino borosilicate glass of the invention includes the following components in the proportions indicated (in wt %):

|  | from | to |
| --- | --- | --- |
| $SiO_2$ | 60 | 80 |
| $B_2O_3$ | 5 | 30 |
| $Al_2O_3$ | 0.1 | 15 |
| $Li_2O$ | 0 | 5 |
| $Na_2O$ | 0.1 | 15 |
| $K_2O$ | 1 | 20 |
| MgO | 0 | 5 |
| CaO | 0 | 5 |
| BaO | 0 | 10 |
| ZnO | 0 | 10 |
| SrO | 0 | 5 |
| $TiO_2$ | 0 | 5 |
| $ZrO_2$ | 0 | 5 |
| $La_2O_3$ | 0 | 5 |
| $P_2O_5$ | 0 | 5 |
| F | 0 | 10 |
| $Sb_2O_3$ | 0 | 0.5 |
| $As_2O_3$ | 0 | <0.3 |
| $SnO_2$ | 0 | 0.5 | where at least one of the following conditions is met:
(i) $MnO_2$ amount less than 1.0 ppm (based on weight),
(ii) $SnO_2$ amount at least 0.1 wt % and Cl amount at least 0.05 wt %,
(iii) $CeO_2$ amount at least 0.005 wt %.

Optionally at least two of the conditions are met. The alumino borosilicate glass, for example, may have an $MnO_2$ amount of less than 1.0 ppm and also an $SnO_2$ amount of at least 0.1 wt % and a Cl amount of at least 0.05 wt %. The alumino borosilicate glass for example may have an $MnO_2$ amount of less than 1.0 ppm and a $CeO_2$ amount of at least 0.005 wt %. The alumino borosilicate glass for example may have an $SnO_2$ amount of at least 0.1 wt % and a Cl amount of at least 0.05 wt % and also a $CeO_2$ amount of at least 0.005 wt %.

The alumino borosilicate glass may also have an $MnO_2$ amount of less than 1.0 ppm, an $SnO_2$ amount of at least 0.1 wt %, a Cl amount of at least 0.05 wt % and a $CeO_2$ amount of at least 0.005 wt %.

It has emerged that by way of the stated measures and also by combination thereof it is possible to obtain advantages in relation to the quality factor according to the invention.

Raw materials for glassmaking are contaminated with $MnO_2$. It is therefore not possible to provide an alumino borosilicate glass that contains no $MnO_2$ whatsoever. Through selection of the raw materials, however, it is possible to reduce the $MnO_2$ contamination. Commercial raw materials afford glasses whose $MnO_2$ amount is at any rate more than 1.0 ppm. Through selection of particularly pure raw materials it is possible to lower the amount of $MnO_2$ to levels of less than 1.0 ppm. The amount of $MnO_2$ is optionally not more than 0.9 ppm, optionally not more than 0.8 ppm, optionally not more than 0.7 ppm, optionally not more than 0.6 ppm, optionally not more than 0.5 ppm, optionally not more than 0.4 ppm, optionally not more than 0.3 ppm, optionally not more than 0.2 ppm, optionally not more than 0.15 ppm, optionally not more than 0.1 ppm. In embodiments of the invention the $MnO_2$ amount is at least 0.01 ppm, is at least 0.02 ppm or at least 0.05 ppm. The $MnO_2$ amount of the alumino borosilicate glass may be situated for example in a range from 0.01 to <1.0 ppm, from 0.01 to 0.9 ppm, from 0.01 to 0.8 ppm, from 0.01 to 0.7 ppm, from 0.01 to 0.6 ppm, from 0.01 to 0.5 ppm, from 0.01 to 0.4 ppm, from 0.01 to 0.3 ppm, from 0.01 to 0.2 ppm, from 0.01 to 0.15 ppm, from 0.01 to 0.1 ppm, from 0.02 to <1.0 ppm, from 0.02 to 0.9 ppm, from 0.02 to 0.8 ppm, from 0.02 to 0.7 ppm, from 0.02 to 0.6 ppm, from 0.02 to 0.5 ppm, from 0.02 to 0.4 ppm, from 0.02 to 0.3 ppm, from 0.02 to 0.2 ppm, from 0.02 to 0.15 ppm, from 0.02 to 0.1 ppm, from 0.05 to <1.0 ppm, from 0.05 to 0.9 ppm, from 0.05 to 0.8 ppm, from 0.05 to 0.7 ppm, from 0.05 to 0.6 ppm, from 0.05 to 0.5 ppm, from 0.05 to 0.4 ppm, from 0.05 to 0.3 ppm, from 0.05 to 0.2 ppm, from 0.05 to 0.15 ppm, or from 0.05 to 0.1 ppm.

The quality factor can also be improved via Sn/Cl refining. In this case a relatively high $SnO_2$ amount in particular has emerged as being advantageous. The $SnO_2$ amount of the alumino borosilicate glass is optionally at least 0.1 wt %, optionally at least 0.15 wt %, optionally at least 0.2 wt %, optionally at least 0.25 wt %, optionally at least 0.3 wt %, optionally at least 0.35 wt %, optionally at least 0.4 wt %. The Cl amount of the alumino borosilicate glass is optionally at least 0.05 wt %, optionally at least 0.1 wt %. The alumino borosilicate glass optionally has an $SnO_2$ amount of at least 0.3 wt % and a Cl amount of at least 0.05 wt %, optionally an $SnO_2$ amount of at least 0.4 wt % and a Cl amount of at least 0.1 wt %. In embodiments of the invention the $SnO_2$ amount is not more than 1.0 wt % or not more than 0.5 wt % and/or the Cl amount is not more than 1.0 wt % or not more than 0.5 wt %. The $SnO_2$ amount may be situated for example in a range from 0.1 wt % to 1.0 wt % and/or the Cl amount in a range from 0.05 wt % to 1.0 wt %. The $SnO_2$ amount is optionally not more than 1.0 wt %, as for example not more than 0.75 wt %, not more than 0.5 wt % or not more than 0.45 wt %. Very high $SnO_2$ contents may increase the crystallization tendency. The Cl amount is optionally not more than 1.0 wt %, as for example not more than 0.75 wt %, not more than 0.5 wt %, not more than 0.45 wt % or not more than 0.4 wt %. Very high Cl contents may cause tank corrosion or destabilize the glass.

The ratio of the weight amount of $SnO_2$ to the weight amount of Cl is optionally in a range from 1:5 to 5:1, as for example from 1:4 to 4:1, from 1:3 to 3:1, from 1:2 to 2:1 or from 1:1.5 to 1.5:1. A particularly good quality factor can be achieved accordingly. Particularly optionally the amount of $SnO_2$ is less than the amount of Cl.

The quality factor can also be improved using $CeO_2$. $CeO_2$ does lead undesirably to an increase in the $Abs_0$ values. Surprisingly, however, it has been found that $CeO_2$ in small proportions can improve the solarization resistance in such a way that the reduction in the $Abs_1$ values over-compensates the increase in the $Abs_0$ values, thereby improving the quality factor. The $CeO_2$ amount is optionally at least 0.005 wt %, optionally at least 0.01 wt %. The $CeO_2$ amount is optionally not more than 0.05 wt % or not more than 0.04 wt %. The $CeO_2$ amount is situated optionally in a range from 0.005 wt % to 0.05 wt %, as for example from 0.01 wt % to 0.04 wt %.

The alumino borosilicate glass of the invention contains optionally less than 0.3 wt %, optionally not more than 0.2 wt %, optionally not more than 0.1 wt % of each of the components $Li_2O$, MgO, CaO, SrO, $TiO_2$, $ZrO_2$, $La_2O_3$, $P_2O_5$, and $As_2O_3$ or particularly optionally, indeed, is free from these components. Particularly in embodiments in which the alumino borosilicate glass contains $CeO_2$ in an amount of at least 0.005 wt % or at least 0.01 wt %, the glass contains optionally less than 0.3 wt %, optionally not more than 0.2 wt %, optionally not more than 0.1 wt % of $TiO_2$, or with particular preference, indeed, is free from $TiO_2$.

The alumino borosilicate glass optionally contains $SiO_2$ in an amount of 62.5 to 77.5 wt %, optionally from 65 to 75 wt %, optionally from 67.5 to 72.5 wt %. The $SiO_2$ amount may be, for example, at least 62.5 wt %, at least 65 wt % or at least 67.5 wt %. The $SiO_2$ amount may be, for example, not more than 77.5 wt %, not more than 75 wt % or not more than 72.5 wt %.

The alumino borosilicate glass optionally contains $B_2O_3$ in an amount of 7.5 to 25 wt %, optionally from 10 to 20 wt %, optionally from 12.5 to 17.5 wt %. The $B_2O_3$ amount may be, for example, at least 7.5 wt %, at least 10 wt % or at least 12.5 wt %. The $B_2O_3$ amount may be, for example, not more than 25 wt %, not more than 20 wt % or not more than 17.5 wt %.

The alumino borosilicate glass optionally contains $Na_2O$ in an amount of 0.2 to 10 wt %, optionally from 0.5 to 5 wt %, optionally from 1 to 3 wt %. The $Na_2O$ amount may be, for example, at least 0.2 wt %, at least 0.5 wt % or at least 1 wt %. The $Na_2O$ amount may be, for example, not more than 10 wt %, not more than 5 wt % or not more than 3 wt %.

The alumino borosilicate glass optionally contains $K_2O$ in an amount of 2 to 17.5 wt %, optionally from 5 to 15 wt %, optionally from 10 to 14 wt %. The $K_2O$ amount may be, for example, at least 2 wt %, at least 5 wt % or at least 10 wt %. The $K_2O$ amount may be, for example, not more than 17.5 wt %, not more than 15 wt % or not more than 14 wt %.

The sum total of the amounts of the alkali metal oxides ($R_2O$) in the alumino borosilicate glass is optionally in a range from 2 to 25 wt %, optionally from 5 to 20 wt %, optionally from 10 to 15 wt %. The $R_2O$ amount may be, for example, at least 2 wt %, at least 5 wt % or at least 10 wt %. The $R_2O$ amount may be, for example, not more than 25 wt %, not more than 20 wt % or not more than 15 wt %. The glass optionally contains no alkali metal oxides other than $Na_2O$ and/or $K_2O$.

The alumino borosilicate glass optionally contains BaO in an amount of 0.02 to 5 wt %, optionally from 0.05 to 2 wt %, optionally from 0.1 to 1 wt %. The BaO amount may be, for example, at least 0.02 wt %, at least 0.05 wt % or at least 0.1 wt %. The BaO amount may be, for example, not more than 5 wt %, not more than 2 wt % or not more than 1 wt %.

The alumino borosilicate glass optionally contains ZnO in an amount of 0.05 to 5 wt %, optionally from 0.1 to 2 wt %, optionally from 0.15 to 1 wt %. The ZnO amount may be, for example, at least 0.05 wt %, at least 0.1 wt % or at least 0.15 wt %. The ZnO amount may be, for example, not more than 5 wt %, not more than 2 wt % or not more than 1 wt %.

The alumino borosilicate glass optionally contains F in an amount of 0.1 to 5 wt %, optionally from 0.2 to 2 wt %, optionally from 0.5 to 1.5 wt %. The F amount may be, for example, at least 0.1 wt %, at least 0.2 wt % or at least 0.5 wt %. The F amount may be, for example, not more than 5 wt %, not more than 2 wt % or not more than 1.5 wt %.

The alumino borosilicate glass may contain $Sb_2O_3$ in an amount of 0.02 to 0.45 wt %, optionally from 0.05 to 0.4 wt %, optionally from 0.1 to 0.35 wt %.

Particular relevance is possessed by the refining agents used, irrespective of the glass system employed. The details below are therefore valid for all glass families.

Sn/Cl refining is optional. It has been found that with an Sn/Cl refining the quality factor achievable is particularly good. The ratio of the weight amount of $SnO_2$ to the weight amount of Cl is optionally in a range from 1:5 to 5:1, as for example from 1:4 to 4:1, from 1:3 to 3:1, from 1:2 to 2:1 or from 1:1.5 to 1.5:1. With particular preference the amount of $SnO_2$ is less than the amount of Cl. The reference in each case is to the amount in the glass and not the amount in the synthesis. In the case of Cl, the amount in the synthesis composition is generally higher than in the glass, since Cl evaporates during production. Particularly relevant for the quality factor is the ratio of the amount of $SnO_2$ to the amount of Cl in the glass. It can be adjusted in particular via the Cl amount in the synthesis composition and via the process regime.

The amount of $As_2O_3$ in the glasses of the invention is optionally less than 0.3 wt %, optionally not more than 0.2 wt %, optionally not more than 0.1 wt %. Even optionally the glass is free from $As_2O_3$. Particularly low $Abs_1$ values can be achieved in this way.

The amount of $Sb_2O_3$ in the glasses of the invention is optionally not more than 0.5 wt %, optionally not more than 0.4 wt %, optionally not more than 0.3 wt %, as for example not more than 0.2 wt % or not more than 0.1 wt %. The glass may even be free from $Sb_2O_3$. Particularly low $Abs_1$ values are achievable in this way.

The amount of the sum of $As_2O_3+Sb_2O_3$ is optionally not more than 0.5 wt %, optionally not more than 0.4 wt %, optionally not more than 0.3 wt %, as for example not more than 0.2 wt % or not more than 0.1 wt %. The glass may even be free from $As_2O_3$ and $Sb_2O_3$. Particularly low $Abs_1$ values are achievable in this way.

The glass may include F, in an amount, for example, of 0 to 45 wt %, more particularly 0.5 to 42.5 wt % or 5 to 40 wt %. Particularly low $Abs_1$ values are achievable in this way.

The glass may also include Cl, in particular as a result of Cl refining. The amount is optionally <2 wt %, optionally <1.5 wt %, optionally <1 wt %. If the Cl amount is too high, this can lead to unwanted salt precipitations on the glass.

When it is said in this description that the glasses are free from a component or do not contain a certain component, this means that the component in question may be present at best as an impurity in the glasses. This means that it is not added in substantial amounts. Insubstantial amounts according to the invention are amounts of less than 500 ppm, optionally less than 300 ppm, optionally less than 100 ppm, optionally less than 50 ppm and optionally less than 10 ppm, in each case on a weight basis.

The present invention also relates to a beam guidance element which consists of a glass which has a quality factor in accordance with the invention and/or an induced absorbance $Abs_1$ in accordance with the invention. In particular the invention also relates to a beam guidance element which consists of a glass which has a quality factor $F(436\text{ nm})=S(436\text{ nm})*(Abs_0(436\text{ nm})+Abs_1(436\text{ nm}))/k$, where $F(436\text{ nm})$ is $<15\text{ ppm/W}$. The invention also relates to a beam guidance element which consists of a glass which has a quality factor $F(RGB)=F(436\text{ nm})+F(546\text{ nm})+F(644\text{ nm})=S(436\text{ nm})*(Abs_0(436\text{ nm})+Abs_1(436\text{ nm}))/k+S(546\text{ nm})*(Abs_0(546\text{ nm})+Abs_1(546\text{ nm}))/k+S(644\text{ nm})*(Abs_0(644\text{ nm})+Abs_1(644\text{ nm}))/k$, where $F(RGB)$ is $<40\text{ ppm/W}$. The invention also relates to a beam guidance element which consists of a glass which has an induced absorbance $Abs_1(436\text{ nm})$, where $Abs_1(436\text{ nm})$ is $<0.01/\text{cm}$. The invention also relates to a beam guidance element which consists of a glass which has an induced absorbance $Abs_1(RGB)=Abs_1(436\text{ nm})+Abs_1(546\text{ nm})+Abs_1(644\text{ nm})$, where $Abs_1(RGB)$ is $<0.03/\text{cm}$.

The invention also relates to a beam guidance element which consists of a glass which has one or more of the following properties, as for example at least two or at least three of the properties:

a quality factor $F(436\text{ nm})=S(436\text{ nm})*(Abs_0(436\text{ nm})+Abs_1(436\text{ nm}))/k$, where $F(436\text{ nm})$ is $<15\text{ ppm/W}$;

a quality factor $F(RGB)=F(436\text{ nm})+F(546\text{ nm})+F(644\text{ nm})=S(436\text{ nm})*(Abs_0(436\text{ nm})+Abs_1(436\text{ nm}))/k+S(546\text{ nm})*(Abs_0(546\text{ nm})+Abs_1(546\text{ nm}))/k+S(644\text{ nm})*(Abs_0(644\text{ nm})+Abs_1(644\text{ nm}))/k$, where $F(RGB)$ is $<40\text{ ppm/W}$;

an induced absorbance $Abs_1(436\text{ nm})<0.01/\text{cm}$;

an induced absorbance $Abs_1(RGB)=Abs_1(436\text{ nm})+Abs_1(546\text{ nm})+Abs_1(644\text{ nm})$, where $Abs_1(RGB)$ is $<0.03/\text{cm}$.

The invention also relates to a beam guidance element which consists of a glass which has one or more of the following properties, as for example at least two of the properties:

a quality factor $F(436\text{ nm})=S(436\text{ nm})*(Abs_0(436\text{ nm})+Abs_1(436\text{ nm}))/k$, where $F(436\text{ nm})$ is $<15\text{ ppm/W}$;

a quality factor $F(RGB)=F(436\text{ nm})+F(546\text{ nm})+F(644\text{ nm})=S(436\text{ nm})*(Abs_0(436\text{ nm})+Abs_1(436\text{ nm}))/k+S(546\text{ nm})*(Abs_0(546\text{ nm})+Abs_1(546\text{ nm}))/k+S(644\text{ nm})*(Abs_0(644\text{ nm})+Abs_1(644\text{ nm}))/k$, where $F(RGB)$ is $<40\text{ ppm/W}$;

an induced absorbance $Abs_1(436\text{ nm})<0.01/\text{cm}$.

The invention also relates to a beam guidance element which consists of a glass which has one or more of the following properties:

a quality factor $F(436\text{ nm})=S(436\text{ nm})*(Abs_0(436\text{ nm})+Abs_1(436\text{ nm}))/k$, where $F(436\text{ nm})$ is $<15\text{ ppm/W}$;

an induced absorbance $Abs_1(436\text{ nm})<0.01/\text{cm}$.

The beam guidance element is optionally a lens, a light-conducting rod, a prism, a freeform or an asphere, optionally a prism.

The present invention also relates to a glass which has a quality factor in accordance with the invention and/or an induced absorbance $Abs_1$ in accordance with the invention. In particular the invention also relates to a glass which has a quality factor $F(436\text{ nm})=S(436\text{ nm})*(Abs_0(436\text{ nm})+Abs_1(436\text{ nm}))/k$, where $F(436\text{ nm})$ is $<15\text{ ppm/W}$. The invention also relates to a glass which has a quality factor $F(RGB)=F(436\text{ nm})+F(546\text{ nm})+F(644\text{ nm})=S(436\text{ nm})*(Abs_0(436\text{ nm})+Abs_1(436\text{ nm}))/k+S(546\text{ nm})*(Abs_0(546\text{ nm})+Abs_1(546\text{ nm}))/k+S(644\text{ nm})*(Abs_0(644\text{ nm})+Abs_1(644\text{ nm}))/k$, where $F(RGB)$ is $<40\text{ ppm/W}$. The invention also relates to a glass which has an induced absorbance $Abs_1(436\text{ nm})$, where $Abs_1(436\text{ nm})$ is $<0.01/\text{cm}$. The invention also relates to a glass which has an induced absorbance $Abs_1(RGB)=Abs_1(436\text{ nm})+Abs_1(546\text{ nm})+Abs_1(644\text{ nm})$, where $Abs_1(RGB)$ is $<0.03/\text{cm}$.

The invention also relates to a glass which has one or more of the following properties, as for example at least two or at least three of the properties:

a quality factor $F(436\text{ nm})=S(436\text{ nm})*(Abs_0(436\text{ nm})+Abs_1(436\text{ nm}))/k$, where $F(436\text{ nm})$ is $<15\text{ ppm/W}$;

a quality factor $F(RGB)=F(436\text{ nm})+F(546\text{ nm})+F(644\text{ nm})=S(436\text{ nm})*(Abs_0(436\text{ nm})+Abs_1(436\text{ nm}))/k+S(546\text{ nm})*(Abs_0(546\text{ nm})+Abs_1(546\text{ nm}))/k+S(644\text{ nm})*(Abs_0(644\text{ nm})+Abs_1(644\text{ nm}))/k$, where $F(RGB)$ is $<40\text{ ppm/W}$;

an induced absorbance $Abs_1(436\text{ nm})<0.01/\text{cm}$;

an induced absorbance $Abs_1(RGB)=Abs_1(436\text{ nm})+Abs_1(546\text{ nm})+Abs_1(644\text{ nm})$, where $Abs_1(RGB)$ is $<0.03/\text{cm}$.

The invention also relates to a glass which has one or more of the following properties, as for example at least two of the properties:

a quality factor $F(436\text{ nm})=S(436\text{ nm})*(Abs_0(436\text{ nm})+Abs_1(436\text{ nm}))/k$, where $F(436\text{ nm})$ is $<15\text{ ppm/W}$;

a quality factor $F(RGB)=F(436\text{ nm})+F(546\text{ nm})+F(644\text{ nm})=S(436\text{ nm})*(Abs_0(436\text{ nm})+Abs_1(436\text{ nm}))/k+S(546\text{ nm})*(Abs_0(546\text{ nm})+Abs_1(546\text{ nm}))/k+S(644\text{ nm})*(Abs_0(644\text{ nm})+Abs_1(644\text{ nm}))/k$, where $F(RGB)$ is $<40\text{ ppm/W}$;

an induced absorbance $Abs_1(436\text{ nm})<0.01/\text{cm}$.

The invention also relates to a glass which has one or more of the following properties:

a quality factor $F(436\text{ nm})=S(436\text{ nm})*(Abs_0(436\text{ nm})+Abs_1(436\text{ nm}))/k$, where $F(436\text{ nm})$ is $<15\text{ ppm/W}$;

an induced absorbance $Abs_1(436\text{ nm})<0.01/\text{cm}$.

The present invention also relates to the use of an imaging system, beam guidance element and/or glass of the invention, more particularly in a projector, or in materials processing.

The invention also relates to a projector including an imaging system, beam guidance element and/or glass of the invention, more particularly a DLP projector.

The following numbered sentences form part of the Summary of the Invention and thus represent elements of the present invention:

1. An imaging system, including:

a) at least one laser light source B having a wavelength $\lambda_B$ in the spectral range from 380 nm to 490 nm, and b) a beam guidance element, wherein the laser light source B is suitable for generating, in at least one point of the beam guidance element, an average surface power density of more than 10 $W/cm^2$, and the beam guidance element consists of a glass which has an induced absorbance $Abs_1(436\text{ nm})$, wherein $Abs_1(436\text{ nm})$ is $<0.01/\text{cm}$.

2. An imaging system, including:

a) at least one laser light source B having a wavelength $\lambda_B$ in the spectral range from 380 nm to 490 nm, and b) a beam guidance element, wherein the laser light source is suitable for generating, in at least one point of the beam guidance element, an average surface power density of more than 10 $W/cm^2$, and the beam guidance element consists of a glass which has a quality factor $F(436\text{ nm})=S(436\text{ nm})*(Abs_0(436\text{ nm})+Abs_1(436\text{ nm}))/k$, wherein $S(436\text{ nm})$ is the thermality at a wavelength of 436 nm, $Abs_1(436\text{ nm})$ is the additional absorbance in comparison to $Abs_0(436\text{ nm})$ at a wavelength of 436 nm of a sample having a thickness of 100 mm after irradiation with a power density of 345 $W/cm^2$ for 72 hours with laser light having a wavelength of 455 nm, $\text{Abs}_0$(436 nm) is the absorbance at a wavelength of 436 nm of a sample having a thickness of 100 mm without such irradiation, and k is the thermal conductivity, and wherein F(436 nm) is <15 ppm/W.

3. An imaging system, including:

a) at least one laser light source B having a wavelength $\lambda_B$ in the spectral range from 380 nm to 490 nm, at least one laser light source G having a wavelength $\lambda_G$ in the spectral range from >490 nm to 585 nm, and at least one laser light source R having a wavelength $\lambda_R$ in the spectral range from >585 nm to 750 nm, and b) a beam guidance element, wherein the laser light source B, the laser light source G and the laser light source R are suitable for generating, in at least one point of the beam guidance element, an average surface power density of more than 10 W/cm², and the beam guidance element consists of a glass which has an induced absorbance $\text{Abs}_1$(RGB)=$\text{Abs}_1$(436 nm)+$\text{Abs}_1$(546 nm)+$\text{Abs}_1$(644 nm), wherein $\text{Abs}_1$(RGB) is <0.03/cm.

4. An imaging system, including:

a) at least one laser light source B having a wavelength $\lambda_B$ in the spectral range from 380 nm to 490 nm, at least one laser light source G having a wavelength $\lambda_G$ in the spectral range from >490 nm to 585 nm, and at least one laser light source R having a wavelength $\lambda_R$ in the spectral range from >585 nm to 750 nm, and b) a beam guidance element, wherein the laser light source B, the laser light source G and the laser light source R are suitable for generating, in at least one point of the beam guidance element, an average surface power density of more than 10 W/cm², and the beam guidance element consists of a glass which has a quality factor F(RGB)=F(436 nm)+F(546 nm)+F(644 nm)=S(436 nm)*($\text{Abs}_0$(436 nm)+$\text{Abs}_1$(436 nm))/k+S(546 nm)*($\text{Abs}_0$(546 nm)+$\text{Abs}_1$(546 nm))/k+S(644 nm)*($\text{Abs}_0$(644 nm)+$\text{Abs}_1$(644 nm))/k, wherein F(RGB) is <40 ppm/W.

5. The imaging system according to at least one of the preceding sentences, wherein the laser light source is a diode laser.

6. The imaging system according to at least one of the preceding sentences, wherein the beam guidance element is a prism.

7. The imaging system according to at least one of the preceding sentences, wherein the laser light source is suitable for generating, in at least one point of the beam guidance element, an average surface power density of 20 W/cm² to 300 W/cm².

8. The imaging system according to at least one of the preceding sentences, wherein S(436 nm), S(546 nm), and S(644 nm) are at most 50 ppm/K.

9. The imaging system according to at least one of the preceding sentences, wherein $\text{Abs}_0$(436 nm), $\text{Abs}_0$(546 nm), and $\text{Abs}_0$(644 nm) are less than 0.01/cm.

10. The imaging system according to at least one of the preceding sentences, wherein $\text{Abs}_1$(436 nm), $\text{Abs}_1$(546 nm), and $\text{Abs}_1$(644 nm) are less than 0.009/cm.

11. The imaging system according to at least one of the preceding sentences, wherein the thermal conductivity k is more than 0.005 W/(cm*K).

12. The imaging system according to at least one of the preceding sentences, wherein the average do/dT at a wavelength of 436 nm, 546 nm and/or 644 nm in a temperature range from 20° C. to 40° C. is in a range from 0.1 to 8.0 ppm/K.

13. A beam guidance element which consists of a glass which has one or more of the following properties:

a quality factor F(436 nm)=S(436 nm)*($\text{Abs}_0$(436 nm)+$\text{Abs}_1$(436 nm))/k, wherein F(436 nm) is <15 ppm/W, a quality factor F(RGB)=F(436 nm)+F(546 nm)+F(644 nm)=S(436 nm)*($\text{Abs}_0$(436 nm)+$\text{Abs}_1$(436 nm))/k+S(546 nm)*($\text{Abs}_0$(546 nm)+$\text{Abs}_1$(546 nm))/k+S(644 nm)*($\text{Abs}_0$(644 nm)+$\text{Abs}_1$(644 nm))/k, wherein F(RGB) is <40 ppm/W, an induced absorbance $\text{Abs}_1$(436 nm)<0.01/cm, an induced absorbance $\text{Abs}_1$(RGB)=$\text{Abs}_1$(436 nm)+$\text{Abs}_1$(546 nm)+$\text{Abs}_1$(644 nm), wherein $\text{Abs}_1$(RGB) is <0.03/cm.

14. A beam guidance element which consists of a glass which has a quality factor F(436 nm)=S(436 nm)*($\text{Abs}_0$(436 nm)+$\text{Abs}_1$(436 nm))/k, wherein F(436 nm) is <15 ppm/W.

15. The beam guidance element according to at least one of sentences 13 and 14, wherein the beam guidance element is selected from lenses, prisms, aspheres, plane plates, freeforms, fast axis collimators and/or light-guiding rods.

16. A glass which has one or more of the following properties:

a quality factor F(436 nm)=S(436 nm)*($\text{Abs}_0$(436 nm)+$\text{Abs}_1$(436 nm))/k, wherein F(436 nm) is <15 ppm/W, a quality factor F(RGB)=F(436 nm)+F(546 nm)+F(644 nm)=S(436 nm)*($\text{Abs}_0$(436 nm)+$\text{Abs}_1$(436 nm))/k+S(546 nm)*($\text{Abs}_0$(546 nm)+$\text{Abs}_1$(546 nm))/k+S(644 nm)*($\text{Abs}_0$(644 nm)+$\text{Abs}_1$(644 nm))/k, wherein F(RGB) is <40 ppm/W, an induced absorbance $\text{Abs}_1$(436 nm)<0.01/cm, an induced absorbance $\text{Abs}_1$(RGB)=$\text{Abs}_1$(436 nm)+$\text{Abs}_1$(546 nm)+$\text{Abs}_1$(644 nm), wherein $\text{Abs}_1$(RGB) is <0.03/cm.

17. A glass which has a quality factor F(436 nm)=S(436 nm)*($\text{Abs}_0$(436 nm)+$\text{Abs}_1$(436 nm))/k, wherein F(436 nm) is <15 ppm/W.

18. The use of an imaging system according to at least one of sentences 1 to 12 in a projector or in materials processing.

19. A projector comprising an imaging system according to at least one of sentences 1 to 12.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
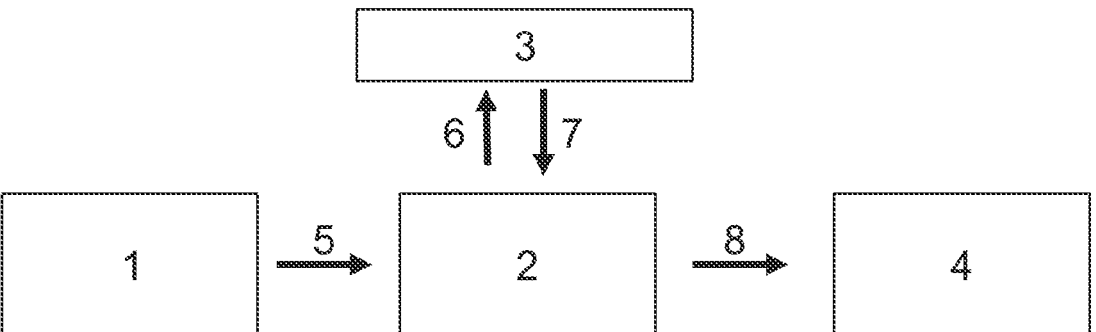
FIG. 1 is shows schematically one embodiment of the present invention.

FIG. 1 shows schematically one embodiment of the present invention. An illustrative configuration of the imaging system as a DLP projector is shown. The three colors blue, green and red (arrow 5) generated by the laser light source(s) 1, after leaving the laser light source(s) 1, reach the beam guidance element 2. The beam guidance element 2 deflects the light onto image-generating chips 3 (arrow 6). The images generated by the image-generating chips 3 (in particular, one image each in blue, green and red) then reach the beam guidance element 2. This is shown by the arrow 7. The beam guidance element 2 then ensures that a composite color image reaches the projection optics 4. This is shown by the arrow 8.

Figure 2:
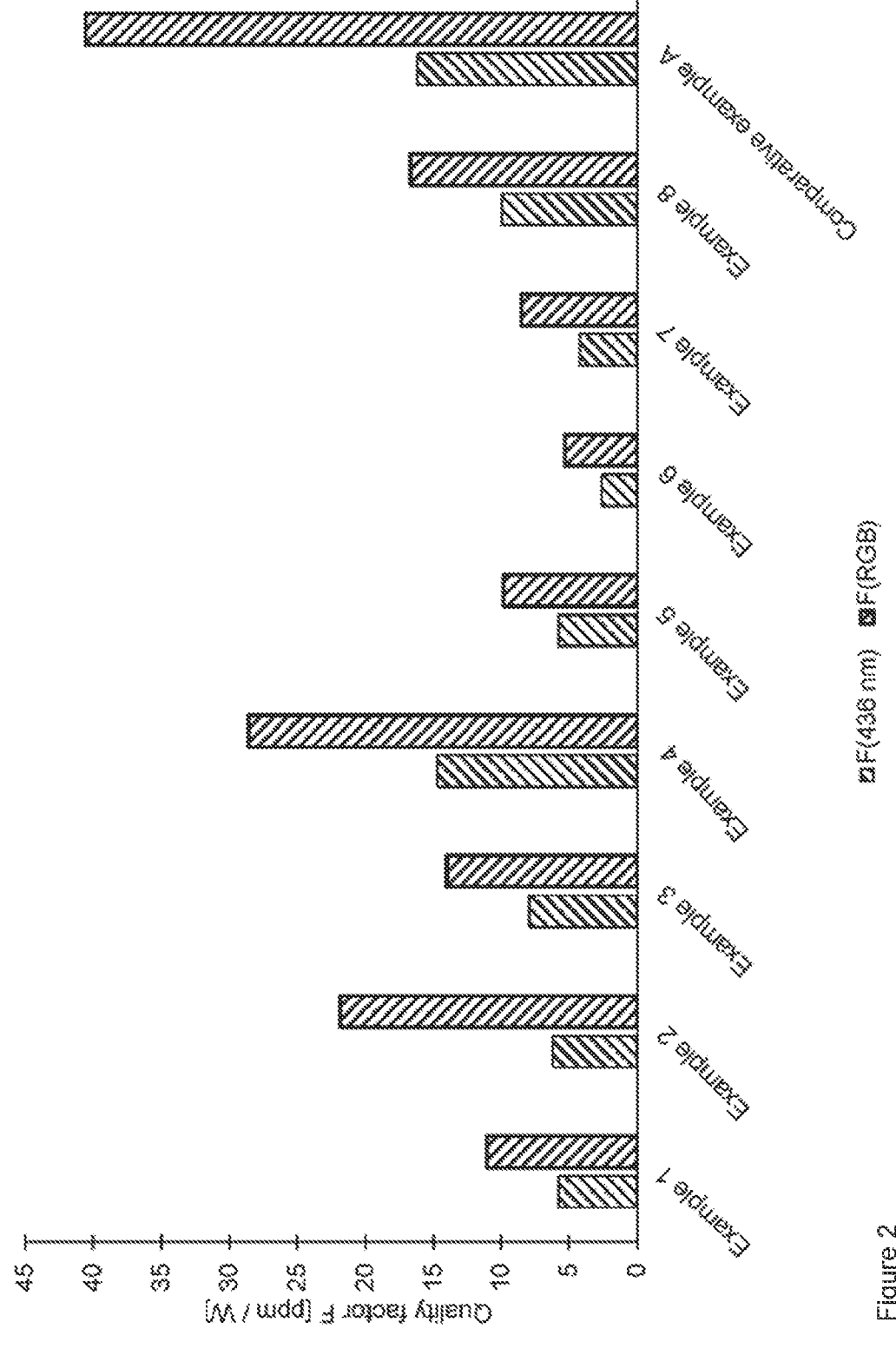
FIG. 2 is a bar chart.

FIG. 2 is a bar chart, which shows the quality factor F(436 nm) and the quality factor F(RGB) for the examples 1 to 8 of the invention and for the non-invention comparative example A. The numerical values shown on the y-axis are data in "ppm/W".

Figure 3:
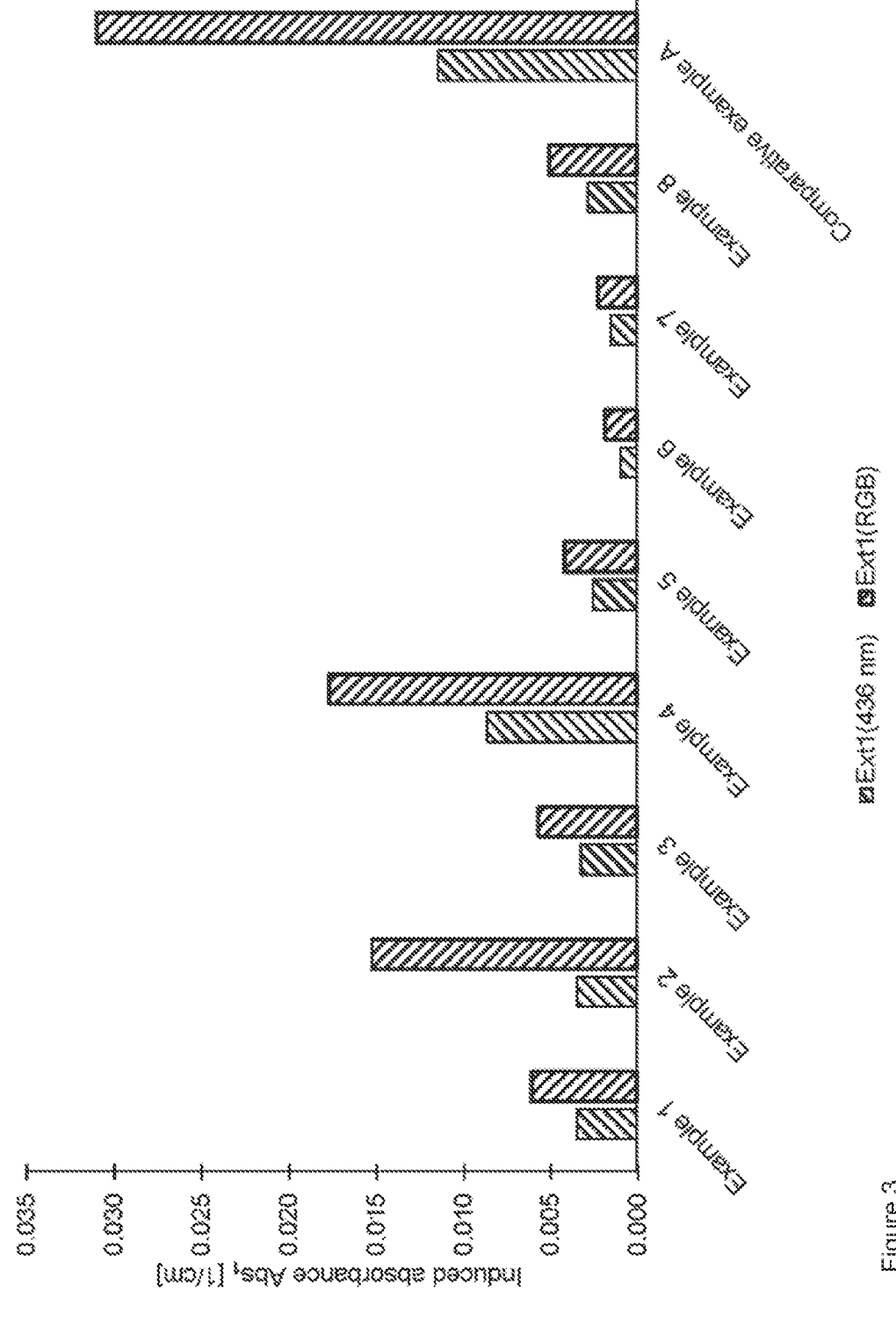
FIG. 3 is a bar chart.

FIG. 3 is a bar chart, which shows the induced absorbances $Abs_1$(436 nm) and $Abs_1$(RGB) for the examples 1 to 8 of the invention and for the non-invention comparative example A. The numerical values shown on the y-axis are data in "1/cm".

EXAMPLES

Samples of the example glasses 1 to 8 of the invention and of the non-invention comparative example A with a sample thickness of 100 mm were each irradiated with a power density of 345 $W/cm^2$ for 72 hours with laser light of a wavelength of 455 nm. In order to achieve both a high power density and a uniform irradiation of the sample, the sample prior to irradiation was polished on all sides and the laser light was irradiated onto the 4×4 $mm^2$ entry face at the angle of total internal reflection (TIR). With a 55 W laser, irradiation was consequently achieved with a power density of 345 $W/cm^2$. The power density in the volume was about 331 $W/cm^2$.

The sample size was 100 mm×4 mm×4 mm.

The compositions of the glasses are shown in table 1 below (in wt %).

TABLE 1

| | Ex. 1 | Ex. 2 | Ex. 3 | Ex. 4 | Ex. 5 | Ex. 6 | Ex. 7 | Ex. 8 | Comp. Ex. A |
|---|---|---|---|---|---|---|---|---|---|
| $SiO_2$ | 70 | 70 | 70 | 70 | 70 | 70 | 70 | 43 | 70 |
| $B_2O3$ | 11 | 11 | 11 | 11 | 11 | 11 | 11 | | 11 |
| $Li_2O$ | | | | | | | | 1 | |
| $Na_2O$ | 10 | 10 | 10 | 10 | 10 | 10 | 10 | 5 | 10 |
| $K_2O$ | 7 | 7 | 7 | 7 | 7 | 7 | 7 | 3 | 7 |
| CaO | 0.2 | 0.2 | 0.2 | 0.2 | 0.2 | 0.2 | 0.2 | | 0.2 |
| BaO | 1 | 1 | 1 | 1 | 1 | 1 | 1 | 10 | 1 |
| ZnO | | | | | | | | 22 | |
| $TiO_2$ | 0.1 | | | 0.05 | | | 0.05 | | 0.1 |
| $ZrO_2$ | | | | | | | | 5 | |
| $La_2O_3$ | | | | | | | | 11 | |
| F | | | | | | | | | |
| $Sb_2O_3$ | 0.3 | | | | 0.3 | | 0.3 | | 0.3 |
| $SnO_2$ | | 0.3 | 0.3 | 0.3 | | 0.3 | | 0.2 | |
| Cl | 0.34 | 0.35 | 0.35 | 0.34 | 0.35 | 0.34 | 0.34 | | 0.33 |
| $CeO_2$ | | 0.025 | 0.01 | | 0.01 | | 0.01 | | |
| $MnO_2$ | 0.1 ppm | 0.7 ppm | 0.1 ppm | 0.1 ppm | 0.1 ppm | 0.1 ppm | 0.1 ppm | 0.1 ppm | 1.1 ppm |

The glasses differed as follows in terms of the $MnO_2$ amount. The $MnO_2$ amount in example 2 was 0.7 ppm (based on weight). In comparative example A, the $MnO_2$ amount was 1.1 ppm (based on weight). For the rest of the example glasses 1 and 3 to 8, the $MnO_2$ amount was in each case 0.1 ppm (based on weight).

The quality factor F(436 nm), the quality factor F(546 nm), the quality factor F(644 nm) and the quality factor F(RGB) were calculated according to the formulae indicated above. For this purpose the corresponding values of the thermality S, the noninduced absorbance $Abs_0$ and of the induced absorbance $Abs_1$ were determined for the wavelengths 436 nm, 546 nm and 644 nm, and the thermal conductivity k of the glass was determined as well. The results are shown in FIGS. 2 and 3. Table 2 below summarizes the measurement values and calculations.

TABLE 2

| | Ex. 1 | Ex. 2 | Ex. 3 | Ex. 4 | Ex. 5 | Ex. 6 | Ex. 7 | Ex. 8 | Comp. Ex. A |
|---|---|---|---|---|---|---|---|---|---|
| S (436 nm) [ppm/K] | 13.7 | 13.7 | 13.7 | 13.7 | 13.7 | 13.7 | 13.7 | 19.6 | 13.7 |
| S (546 nm) [ppm/K] | 12.9 | 12.9 | 12.9 | 12.9 | 12.9 | 12.9 | 12.9 | 18.0 | 12.9 |
| S (644 nm) [ppm/K] | 12.3 | 12.3 | 12.3 | 12.3 | 12.3 | 12.3 | 12.3 | 17.3 | 12.3 |

TABLE 2-continued

| | Ex. 1 | Ex. 2 | Ex. 3 | Ex. 4 | Ex. 5 | Ex. 6 | Ex. 7 | Ex. 8 | Comp. Ex. A |
|---|---|---|---|---|---|---|---|---|---|
| $Abs_0$ (436 nm) [1/cm] | 0.0012 | 0.0015 | 0.0031 | 0.0032 | 0.0021 | 0.0011 | 0.0018 | 0.0013 | 0.0016 |
| $Abs_0$ (546 nm) [1/cm] | 0.0012 | 0.0014 | 0.0020 | 0.0016 | 0.0013 | 0.0010 | 0.0015 | 0.0004 | 0.0008 |
| $Abs_0$ (644 nm) [1/cm] | 0.0008 | 0.0005 | 0.0010 | 0.0016 | 0.0006 | 0.0005 | 0.0016 | 0.0006 | 0.0012 |
| $Abs_1$ (436 nm) [1/cm] | 0.0035 | 0.0035 | 0.0033 | 0.0087 | 0.0026 | 0.0010 | 0.0016 | 0.0029 | 0.0115 |
| $Abs_1$ (546 nm) [1/cm] | 0.0015 | 0.0079 | 0.0016 | 0.0057 | 0.0009 | 0.0006 | 0.0004 | 0.0015 | 0.0103 |
| $Abs_1$ (644 nm) [1/cm] | 0.0011 | 0.0039 | 0.0008 | 0.0033 | 0.0007 | 0.0003 | 0.0003 | 0.0007 | 0.0092 |
| $Abs_1$ (RGB) [1/cm] | 0.0061 | 0.0153 | 0.0057 | 0.0177 | 0.0042 | 0.0019 | 0.0023 | 0.0051 | 0.0310 |
| k [W/(cm*K)] | 0.011 | 0.011 | 0.011 | 0.011 | 0.011 | 0.011 | 0.011 | 0.0083 | 0.011 |
| F (436 nm) [ppm/W] | 5.76 | 6.20 | 7.93 | 14.71 | 5.80 | 2.59 | 4.20 | 9.92 | 16.18 |
| F (546 nm) [ppm/W] | 3.09 | 10.74 | 4.12 | 8.50 | 2.54 | 1.85 | 2.20 | 4.12 | 12.84 |
| F (644 nm) [ppm/W] | 2.16 | 4.90 | 1.96 | 5.40 | 1.44 | 0.89 | 2.11 | 2.70 | 11.54 |
| F (RGB) [ppm/W] | 11.0 | 21.8 | 14.0 | 28.6 | 9.8 | 5.3 | 8.5 | 16.7 | 40.6 |

It is apparent that glasses 1 to 8 of the invention, in contrast to comparative example A, have a quality factor F(436 nm)<15 ppm/W, a quality factor F(546 nm)<12 ppm/W, a quality factor F(644 nm)<10 ppm/W and a quality factor F(RGB)<40 ppm/W. Moreover, glasses 1 to 8 of the invention, in contrast to comparative example A, have induced absorbances $Abs_1$ such that $Abs_1$(436 nm) is <0.01/cm, $Abs_1$(546 nm) is <0.01/cm, $Abs_1$(644 nm) is <0.009/cm and $Abs_1$(RGB) is <0.03/cm.

In large parts the example glasses 1 to 7 and the comparative example A have a very similar composition. They are each borosilicate glasses. The principal differences are essentially that examples 1, 5 and 7, and comparative example A, were refined using $Sb_2O_3$, whereas examples 2, 3, 4 and 6 underwent Sn/Cl refining. Comparative example A was produced with conventional raw materials, resulting in a comparatively high $MnO_2$ amount of more than 1.0 ppm. For examples 2, 3, 5 and 7, $CeO_2$ was used. Examples 1, 4 and 7, and the comparative example A, additionally contained small amounts of $TiO_2$. Example 8 is a silicate glass refined using $SnO_2$.

Particularly good results were achieved with example 6, which is distinguished by Sn/Cl refining and the absence of $TiO_2$.

LIST OF REFERENCE NUMERALS

1 Laser light source(s)
2 Beam guidance element
3 Image-generating chips
4 Projection optics
5 Light from the laser light source(s) arrives at the beam guidance element
6 Light from the beam guidance element is redirected to the image-generating chips
7 The images generated by the image-generating chips reach the beam guidance element
8 A composite color image reaches the projection optics While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An imaging system, comprising:
at least one laser light source B having a wavelength $\lambda_B$ in a spectral range from 380 nm to 490 nm; and
a beam guidance element, the at least one laser light source B being configured for generating, in at least one point of the beam guidance element, an average surface power density of more than 10 $W/cm^2$, the beam guidance element including a glass which has a quality factor F(436 nm)=S(436 nm)*($Abs_0$(436 nm)+$Abs_1$(436 nm))/k, wherein S(436 nm) is a thermality at a wavelength of 436 nm, $Abs_1$(436 nm) is an additional absorbance in comparison to $Abs_0$(436 nm) at a wavelength of 436 nm of a sample having a thickness of 100 mm after an irradiation with a power density of 345 $W/cm^2$ for 72 hours with a laser light having a wavelength of 455 nm, $Abs_0$(436 nm) is an absorbance at a wavelength of 436 nm of a sample having a thickness of 100 mm without the irradiation, k is the thermal conductivity, and the quality factor F(436 nm) is <15 ppm/W.

2. The imaging system according to claim 1, wherein the at least one laser light source B is a diode laser.

3. The imaging system according to claim 1, wherein the beam guidance element is a prism.

4. The imaging system according to claim 1, wherein the at least one laser light source is configured for generating, in the at least one point of the beam guidance element, an average surface power density of 20 $W/cm^2$ to 300 $W/cm^2$.

5. The imaging system according to claim 1, wherein S(436 nm), S(546 nm), and S(644 nm) are at most 50 ppm/K.

6. The imaging system according to claim 1, wherein $Abs_0(436\ nm)$, $Abs_0(546\ nm)$, and $Abs_0(644\ nm)$ are less than 0.01/cm.

7. The imaging system according to claim 1, wherein $Abs_1(436\ nm)$, $Abs_1(546\ nm)$, and $Abs_1(644\ nm)$ are less than 0.009/cm.

8. The imaging system according to claim 1, wherein the thermal conductivity k is more than 0.005 W/(cm*K).

9. The imaging system according to claim 1, wherein an average do/dT at a wavelength of at least one of 436 nm, 546 nm, and 644 nm in a temperature range from 20° C. to 40° C. is in a range from 0.1 to 8.0 ppm/K.

10. The imaging system according to claim 1, wherein the imaging system is configured for being used in a projector or in a materials processing.

11. An imaging system, comprising:

at least one laser light source B having a wavelength $\lambda_B$ in a spectral range from 380 nm to 490 nm;

at least one laser light source G having a wavelength $\lambda_G$ in a spectral range from >490 nm to 585 nm;

at least one laser light source R having a wavelength $\lambda_R$ in a spectral range from >585 nm to 750 nm; and a beam guidance element, the laser light source B, the laser light source G, and the laser light source R being configured for generating, in at least one point of the beam guidance element, an average surface power density of more than 10 $W/cm^2$, the beam guidance element including a glass which has an induced absorbance $Abs_1(RGB)=Abs_1(436\ nm)+Abs_1(546\ nm)+Abs_1(644\ nm)$, wherein $Abs_1(RGB)$ is <0.03/cm.

12. A beam guidance element, comprising:

a glass which has at least one of the following properties:

(a) a quality factor $F(436\ nm)=S(436\ nm)*(Abs_0(436\ nm)+Abs_1(436\ nm))/k$, wherein $F(436\ nm)$ is <15 ppm/W;

(b) a quality factor $F(RGB)=F(436\ nm)+F(546\ nm)+F(644\ nm)=S(436\ nm)*(Abs_0(436\ nm)+Abs_1(436\ nm))/k+S(546\ nm)*(Abs_0(546\ nm)+Abs_1(546\ nm))/k+S(644\ nm)*(Abs_0(644\ nm)+Abs_1(644\ nm))/k$, wherein $F(RGB)$ is <40 ppm/W;

(c) an induced absorbance $Abs_1(436\ nm)<0.01/cm$; and (d) an induced absorbance $Abs_1(RGB)=Abs_1(436\ nm)+Abs_1(546\ nm)+Abs_1(644\ nm)$, wherein $Abs_1(RGB)$ is <0.03/cm.

13. The beam guidance element according to claim 12, wherein the beam guidance element is selected from at least one of lenses, prisms, aspheres, plane plates, freeforms, fast axis collimators, and light-guiding rods.

14. A glass, comprising:

at least one of the following properties:

(a) a quality factor $F(436\ nm)=S(436\ nm)*(Abs_0(436\ nm)+Abs_1(436\ nm))/k$, wherein $F(436\ nm)$ is <15 ppm/W;

(b) a quality factor $F(RGB)=F(436\ nm)+F(546\ nm)+F(644\ nm)=S(436\ nm)*(Abs_0(436\ nm)+Abs_1(436\ nm))/k+S(546\ nm)*(Abs_0(546\ nm)+Abs_1(546\ nm))/k+S(644\ nm)*(Abs_0(644\ nm)+Abs_1(644\ nm))/k$, wherein $F(RGB)$ is <40 ppm/W;

(c) an induced absorbance $Abs_1(436\ nm)<0.01/cm$; and (d) an induced absorbance $Abs_1(RGB)=Abs_1(436\ nm)+Abs_1(546\ nm)+Abs_1(644\ nm)$, wherein $Abs_1(RGB)$ is <0.03/cm.

* * * * *